United States Patent
Koyama et al.

(10) Patent No.: US 6,966,177 B2
(45) Date of Patent: Nov. 22, 2005

(54) ANOMALY JUDGMENT APPARATUS FOR SECONDARY AIR SUPPLY SYSTEM

(75) Inventors: Hiroyasu Koyama, Susono (JP); Kenji Kimura, Okazaki (JP); Shigemasa Hirooka, Susono (JP); Takeo Ogiso, Toyota (JP); Keita Nakanishi, Iwata (JP)

(73) Assignees: Toyota Jidosha Kabushiki Kaisha, Toyota (JP); Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 10/819,235

(22) Filed: Apr. 7, 2004

(65) Prior Publication Data

US 2004/0211169 A1 Oct. 28, 2004

(30) Foreign Application Priority Data

Apr. 24, 2003 (JP) .............................. 2003-119643

(51) Int. Cl.[7] .............................................. F01N 3/00
(52) U.S. Cl. .............................. 60/277; 60/276; 60/289
(58) Field of Search .......................... 60/274, 276, 277, 60/289

(56) References Cited

U.S. PATENT DOCUMENTS

| 5,400,591 | A | * | 3/1995 | Aramaki | 60/274 |
|---|---|---|---|---|---|
| 5,519,992 | A | * | 5/1996 | Hosoya et al. | 60/276 |
| 5,560,199 | A | * | 10/1996 | Agustin et al. | 60/274 |
| 5,782,086 | A | * | 7/1998 | Kato et al. | 60/274 |
| 5,852,929 | A | * | 12/1998 | Kato et al. | 60/274 |
| 6,393,833 | B2 | * | 5/2002 | Mizoguchi | 60/289 |
| 2003/0061805 | A1 | * | 4/2003 | Hirooka et al. | 60/289 |
| 2004/0194446 | A1 | * | 10/2004 | Hirooka | 60/277 |

FOREIGN PATENT DOCUMENTS

| JP | A 9-125946 | 5/1997 |
|---|---|---|
| JP | A 2003-83048 | 3/2003 |

* cited by examiner

*Primary Examiner*—Tu M. Nguyen
(74) *Attorney, Agent, or Firm*—Oliff & Berridge, PLC

(57) ABSTRACT

An anomaly judgment apparatus for a secondary air supply system which includes a secondary air supply path for introducing secondary air from an intake path of an engine into an exhaust path at a location upstream of a catalytic converter disposed in the exhaust path. The apparatus includes a pressure detector for detecting pressure in the secondary air supply path, and an anomaly judgment section for calculating pulsation level indicative of the degree of pulsation of pressure detected by the pressure detector and for judging, on the basis of at least the pulsation level, whether or not the secondary air supply system is anomalous. The apparatus further includes an anomaly judgment prohibiting section for prohibiting judgment by the anomaly judgment section when the degree of propagation of intake air pulsation arising in the intake path into the secondary air supply path is equal to or higher than a predetermined level.

6 Claims, 10 Drawing Sheets

ANOMALY JUDGMENT APPARATUS FOR SECONDARY AIR SUPPLY SYSTEM

BACKGROUND OF THE INVENTION

1. Field of the Invention

The present invention relates to an anomaly judgment apparatus for a secondary air supply system, which is adapted to supply secondary air to a portion of an exhaust path of an internal combustion engine located upstream of a catalytic converter disposed in the exhaust path.

2. Description of the Related Art

Conventionally, in order to eliminate harmful components (CO, HC, and $NO_x$) from exhaust gas emitted from an internal combustion engine, a three-way catalytic converter (herein may be referred to merely as a "catalytic converter") is disposed in an exhaust path of the internal combustion engine. When the temperature of the three-way catalytic converter is lower than an activation temperature needed for the three-way catalytic converter to exhibit its catalytic function, the three-way catalytic converter fails to sufficiently exhibit its exhaust purification function. Therefore, when the temperature of the three-way catalytic converter is lower than the activation temperature; for example, in the case where an internal combustion engine is started when the temperature of the internal combustion engine is near ambient temperature (outside air temperature) (hereinafter referred to as "at the time of cold start"), the temperature of the three-way catalytic converter must be increased as soon as possible so as to activate (warm up) the three-way catalytic converter.

In order to fulfill the above need, a secondary air supply system is widely used. The secondary air supply system supplies secondary air to a portion of the exhaust path located upstream of the three-way catalytic converter, whereby the three-way catalytic converter is actively warmed up by heat of reaction that is generated when oxygen contained in the secondary air oxidizes unburnt components (particularly HC) contained in exhaust gas.

Component parts of such a secondary air supply system generally include an air pump and an air switching valve. The air pump is adapted to introduce air into a secondary air supply path connected to a portion of the exhaust path located upstream of the three-way catalytic converter. The air switching valve is provided in a portion of the secondary air supply path located downstream of the air pump and adapted to control opening and closing of the secondary air supply path. When anomaly arises in such a component part of the secondary air supply system, the following problem arises. Even when an instruction to supply secondary air is issued to the secondary air supply system, secondary air is not supplied, and thus warming up of the three-way catalytic converter is delayed, resulting in an increase in the quantity of emissions. Alternatively, even when an instruction to stop supplying secondary air is issued to the secondary air supply system, secondary air continues being supplied, and thus the air-fuel ratio of exhaust gas shifts to the lean side, resulting in a drop in $NO_x$ elimination efficiency. Therefore, when anomaly arises in the secondary air supply system (component parts of the same), the occurrence of the anomaly must be detected.

In this connection, a secondary air supply system (anomaly judgment apparatus for the same) disclosed in Japanese Patent Application Laid-Open (kokai) No. 2003-83048 is configured as follows. A pressure sensor is provided to detect pressure in a portion of a secondary air supply path that extends between an air pump and an air switching valve, which are component parts of the secondary air supply system. Whether or not any of the component parts is anomalous is judged on the basis of pressure detected by the pressure sensor and the level of pulsation of the detected pressure (a value indicating (evaluating) the degree of pulsation; specifically, the amplitude of the detected pressure) stemming from exhaust pulsation.

The above disclosed secondary air supply system is configured such that air is introduced into the secondary air supply path from an intake path (specifically, from a portion of the intake path located downstream of an air filter and upstream of a throttle valve) of an internal combustion engine.

Also, intake air pulsation unavoidably occurs in a portion of the intake path located downstream of the throttle valve of the internal combustion engine. In a certain operation condition (which will be described later in detail) of the internal combustion engine, the intake air pulsation propagates into a portion of the intake path located upstream of the throttle valve. Thus, in the above disclosed secondary air supply system, in some cases, intake air pulsation may propagate into the secondary air supply path.

When intake air pulsation propagates into the secondary air supply path, the intake air pulsation influences an output of the pressure sensor. For example, in the case where the air switching valve is closed, and pulsation stemming from exhaust pulsation does not arise within the secondary air supply path (or the level of pulsation stemming from exhaust pulsation is low), the pulsation level of pressure detected by the pressure sensor must be calculated as being low, but in some cases the pulsation level is calculated as being high. Thus, the above disclosed anomaly judgment apparatus—which judges from the pulsation level whether or not the secondary air supply system (component parts of the same) is anomalous—may make a false judgment.

SUMMARY OF THE INVENTION

An object of the present invention is to provide an anomaly judgment apparatus for a secondary air supply system capable of accurately judging, on the basis of the pulsation level of pressure in a secondary air supply path, whether or not the secondary air supply system is anomalous.

To achieve the above object, the present invention provides an anomaly judgment apparatus for a secondary air supply system which includes a secondary air supply path for introducing secondary air into a portion of an exhaust path of an internal combustion engine located upstream of a catalytic converter disposed in the exhaust path from a portion of an intake path of the internal combustion engine located upstream of a throttle valve disposed in the intake path, comprising pressure detection means for detecting pressure in the secondary air supply path; and anomaly judgment means for calculating pulsation level indicative of the degree of pulsation of pressure detected by the pressure detection means and for judging, on the basis of at least the pulsation level, whether or not the secondary air supply system is anomalous. The anomaly judgment apparatus further comprises anomaly judgment prohibition means for prohibiting judgment by the anomaly judgment means when the degree of propagation of intake air pulsation arising in the intake path into the secondary air supply path is equal to or higher than a predetermined level.

The above-mentioned pulsation level indicates the degree of pulsation of pressure detected as described above. The pulsation level is, for example, the amplitude of the detected pressure or an integrated pulsation value (area) that is obtained by integrating the absolute value of the deviation between the detected pressure and a dulled pressure that follows the detected pressure in a predetermined relation.

Preferably, a secondary air supply system to which the anomaly judgment apparatus for a secondary air supply system according to the present invention is applied includes an air pump and an air switching valve. The air pump is provided in the secondary air supply path and adapted to introduce (transfer under pressure) air into the secondary air supply path. The air switching valve is provided in a portion of the secondary air supply path located downstream of the air pump and adapted to control opening and closing of the secondary air supply path.

As described previously, in the secondary air supply system configured in such a manner as to introduce air into the secondary air supply path from a portion of the intake path of an internal combustion engine located upstream of the throttle valve, the following problem potentially arises. In a certain operation condition of the internal combustion engine, the intake air pulsation propagates into the secondary air supply path, and thus the above-mentioned pulsation level can be calculated as a value different from (greater than) a pulsation level stemming from exhaust pulsation. In this case, when the pulsation level is used as a basis for judging whether or not the secondary air supply system is anomalous, a false judgment may result.

On the basis of the above finding, as described previously, the anomaly judgment apparatus for a secondary air supply system according to the present invention is configured such that, when the degree of propagation of intake air pulsation arising in the intake path into the secondary air supply path is equal to or higher than a predetermined level, judgment on the basis of the pulsation level is not performed, thereby preventing occurrence of a false judgment which could otherwise result from propagation of intake air pulsation into the secondary air supply path. In this case, preferably, the anomaly judgment means is configured such that, when the anomaly judgment prohibition means prohibits making judgment, the anomaly judgment means judges whether or not the secondary air supply system is anomalous, on the basis of the pulsation level calculated after the prohibition is removed.

In this case, preferably, the anomaly judgment prohibition means comprises rotational-speed detection means for detecting a rotational speed of the internal combustion engine; throttle valve opening detection means for detecting an opening of the throttle valve; and acquisition means for acquiring the degree of propagation of the intake air pulsation into the secondary air supply path on the basis of the rotational speed of the internal combustion engine and the throttle valve opening. Also, the anomaly judgment prohibition means is configured such that, when the degree of propagation that the acquisition means acquires by use of the detected rotational speed of the internal combustion engine and the detected throttle valve opening is equal to or greater than a predetermined degree, the anomaly judgment prohibition means prohibits the anomaly judgment means from making judgment.

Generally, when the pressure of air in a portion of the intake path located downstream of the throttle valve (hereinafter referred to as the "throttle valve downstream pressure") varies, the flow rate (mass flow rate) of air passing through the throttle valve (hereinafter referred to as the "throttle valve passing air flow rate") varies. When the throttle valve downstream pressure is equal to or lower than the hydrodynamic critical pressure (and the throttle valve opening is constant), the velocity of air passing through the throttle valve reaches sonic velocity, and thus the throttle valve passing air flow rate becomes constant irrespective of the throttle valve downstream pressure. Therefore, when the throttle valve downstream pressure is higher than the critical pressure, the throttle valve passing air flow rate can fluctuate in accordance with intake air pulsation that arises in a portion of the intake path located downstream of the throttle valve; accordingly, the intake air pulsation can propagate into a portion of the intake path located upstream of the throttle valve (and thus into the secondary air supply path). By contrast, when the throttle valve downstream pressure is equal to or lower than the critical pressure, the throttle valve passing air flow rate does not fluctuate in accordance with the intake air pulsation; accordingly, the intake air pulsation does not propagate into a portion of the intake path located upstream of the throttle valve (and thus into the secondary air supply path).

The throttle valve downstream pressure is determined mainly on the basis of the rotational speed of an internal combustion engine and the throttle valve opening. Thus, on the basis of the rotational speed of an internal combustion engine and the throttle valve opening, the degree of propagation of intake air pulsation into the secondary air supply path can be accurately acquired (estimated or determined). On the basis of this finding, the acquisition means is configured in such a manner as to acquire the degree of propagation of intake air pulsation into the secondary air supply path on the basis of the rotational speed of an internal combustion engine and the throttle valve opening. The acquisition means allows acquisition of the degree of propagation of intake air pulsation into the secondary air supply path in an accurate manner and by use of a simple configuration, and thus an accurate determination can be made as to whether or not judgment by the anomaly judgment means is to be prohibited, thereby more reliably preventing occurrence of a false judgment which could otherwise result from propagation of intake air pulsation into the secondary air supply path.

The present invention further provides an anomaly judgment apparatus for a secondary air supply system configured such that air is introduced into the aforementioned secondary air supply path from a portion of the aforementioned intake path located downstream of an air filter disposed in the intake path and upstream of a throttle valve disposed in the intake path, comprising pressure detection means similar to that described previously; and anomaly judgment means similar to that described previously. The anomaly judgment apparatus further comprises rate-of-change acquisition means for acquiring the rate of change in the opening of the throttle valve; and anomaly judgment prohibition means for prohibiting the anomaly judgment means from making judgment over a predetermined period of time starting from a point of time when the absolute value of the acquired rate of change becomes equal to or greater than a predetermined value.

When the throttle valve opening varies, the throttle valve passing air flow rate varies, in turn resulting in a variation in the flow rate of air passing through the air filter disposed in a portion of the intake path located upstream of the throttle valve. When the flow rate of air passing through the air filter varies, the magnitude of pressure loss associated with the air filter varies. Accordingly, when the throttle valve opening changes abruptly, the pressure of air in a portion of the intake path located upstream of the throttle valve (hereinafter referred to as the "throttle valve upstream pressure") changes abruptly. As a result, air column vibration can arise in the secondary air supply path, which is connected to a portion of the intake path located upstream of the throttle valve. Influence of the air column vibration emerges as an output of the pressure sensor. Thus, as in the previously described case of propagation of intake air pulsation into the secondary air supply path, when the throttle valve opening changes abruptly, over a predetermined period of time ranging from the abrupt change to attenuation of the air column vibration, the above-mentioned pulsation level can be calculated as a value different from (greater than) a pulsation level stemming from exhaust pulsation. Therefore, when the calculated pulsation level is used as a basis for judging whether or not the secondary air supply system is anomalous, a false judgment may result.

On the basis of the above finding, the anomaly judgment prohibition means is configured in such a manner as to prohibit the anomaly judgment means from making judgment over a predetermined period of time starting from a point of time when the absolute value of the acquired rate of change becomes equal to or greater than a predetermined value, thereby preventing occurrence of a false judgment which could otherwise result from occurrence of air column vibration in the secondary air supply path. Also, in this case, preferably, the anomaly judgment means is configured such that, when the anomaly judgment prohibition means prohibits making judgment, the anomaly judgment means judges whether or not the secondary air supply system is anomalous, on the basis of a pulsation level that is calculated after the prohibition is removed.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

Figure 1:
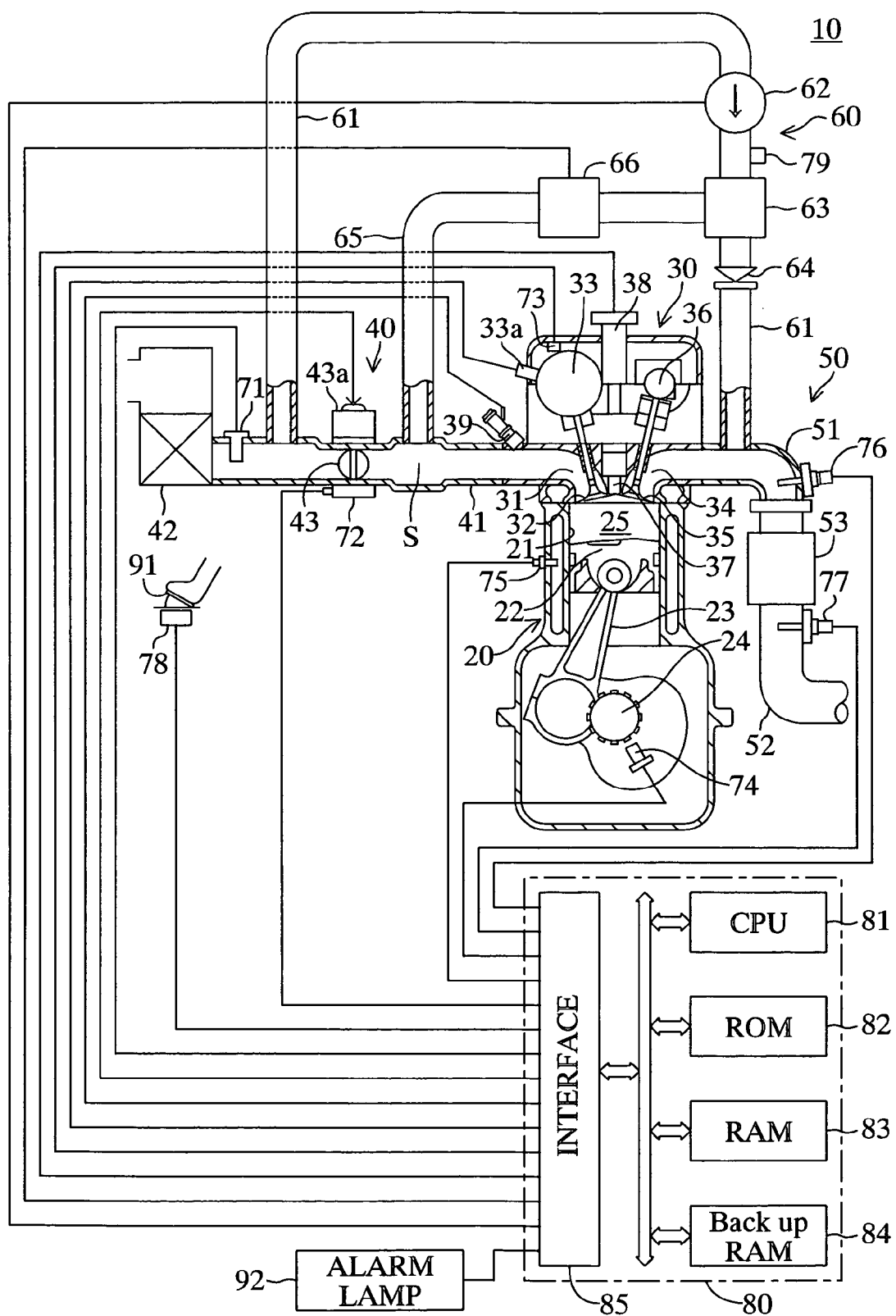
FIG. 1 is a schematic view of an internal combustion engine to which anomaly judgment apparatus for a secondary air supply system according to the present invention is applied.

An embodiment of an anomaly judgment apparatus for a secondary air supply system according to the present invention will be described in detail with reference to the drawings. FIG. 1 shows a schematic system configuration of the anomaly judgment apparatus applied to a spark-ignition-type multi-cylinder (4-cylinder) internal combustion engine 10 equipped with a secondary air supply system. FIG. 1 shows a configuration related to only a certain single cylinder among multiple cylinders. A configuration related to each of other cylinders is similar to that of FIG. 1.

The internal combustion engine 10 includes a cylinder block section 20 including a cylinder block, a cylinder block lower-case, and an oil pan; a cylinder head section 30 fixed on the cylinder block section 20; an intake system 40 for supplying a gasoline-air mixture to the cylinder block section 20; an exhaust system 50 for emitting exhaust gas from the cylinder block section 20 to the exterior of the engine 10; and a secondary air supply system 60 for performing secondary air supply control to supply secondary air to the exhaust system 50.

The cylinder block section 20 includes cylinders 21, pistons 22, connecting rods 23, and a crankshaft 24. Each of the pistons 22 reciprocates within the corresponding cylinder 21. The reciprocating motion of the piston 22 is transmitted to the crankshaft 24 via the corresponding connecting rod 23, whereby the crankshaft 24 rotates. The cylinder 21 and the head of the piston 22, together with the cylinder head section 30, form a combustion chamber 25.

The cylinder head section 30 includes an intake port 31 communicating with the combustion chamber 25; an intake valve 32 for opening and closing the intake port 31; a variable intake timing unit 33 including an intake cam shaft for driving the intake valve 32 and adapted to continuously change the phase angle of the intake cam shaft; an actuator 33a for the variable intake timing unit 33; an exhaust port 34 communicating with the combustion chamber 25; an exhaust valve 35 for opening and closing the exhaust port 34; an exhaust cam shaft 36 for driving the exhaust valve 35; a spark plug 37; an igniter 38 including an ignition coil for generating a high voltage to be applied to the spark plug 37; and an injector (fuel injection means) 39 for injecting fuel into the intake port 31.

The intake system 40 includes an intake pipe 41 communicating with the intake port 31, forming an intake path together with the intake port 31, and including an intake manifold, a portion of the intake pipe 41 functioning as a surge tank S; an air filter 42 provided at an end portion of the intake pipe 41; a throttle valve 43 provided in the intake pipe 41 and adapted to vary the cross-sectional opening area of the intake path; and a throttle valve actuator 43a, which includes a DC motor and serves as throttle valve drive means.

The exhaust system 50 includes an exhaust manifold 51 communicating with the exhaust port 34; an exhaust pipe 52 connected to the exhaust manifold 51; and a catalytic converter (also called a "3-way catalytic converter" or "start catalytic converter") 53 disposed in the exhaust pipe 52. The exhaust port 34, the exhaust manifold 51, and the exhaust pipe 52 constitute an exhaust path.

The secondary air supply system 60 includes a secondary air supply path 61 for establishing communication between a portion of the intake path located downstream of the air filter 42 and upstream of the throttle valve 43 and a portion of the exhaust path (in actuality, a portion of the exhaust path of each cylinder) located upstream of the catalytic converter 53; an air pump 62 provided in the secondary air supply path 61 and adapted to forcibly transfer air under pressure from the intake path to the exhaust path; an air switching valve (hereinafter referred to as an "ASV") 63 disposed in a portion of the secondary air supply path 61 downstream of the air pump 62 and adapted to open and close the secondary air supply path 61; and a reed valve 64 provided in a portion of the secondary air supply path 61 located downstream of the ASV 63 and adapted to permit air flow in the secondary air supply path 61 only in the direction toward the exhaust path. The secondary air supply system 60 further includes a negative-pressure introduction path 65 for introducing negative pressure into the ASV 63 from the surge tank S; and a normally closed solenoid on-off valve (hereinafter referred to as the "solenoid valve") 66 provided in the negative-pressure introduction path 65 and adapted to open and close the negative-pressure introduction path 65.

The ASV 63 is configured in such a manner as to be in the open state when negative pressure is introduced thereinto from the surge tank S, and to be in the closed state when negative pressure is not introduced thereinto. In other words, the ASV 63 is in the open state when the solenoid valve 66 is in the excited state (in the open state), and is in the closed state when the solenoid valve 66 is in the unexcited state (in the closed state). Under the above-described configuration, when the secondary air supply control (hereinafter may be called "AI") is to be performed, the secondary air supply system 60 activates the air pump 62 and brings the solenoid valve 66 to the open state; and when the secondary air supply control is to be stopped, the secondary air supply system 60 deactivates the air pump 62 and brings the solenoid valve 66 to the closed state.

Meanwhile, the present system includes a hot-wire air flowmeter 71; a throttle position sensor 72; a cam position sensor 73; a crank position sensor 74; a water temperature sensor 75; an air-fuel ratio sensor 76 disposed in a portion of the exhaust path located upstream of the catalytic converter 53; an air-fuel ratio sensor 77 disposed in a portion of the exhaust path located downstream of the catalytic converter 53; an accelerator opening sensor 78; and a pressure sensor 79, which serves as the pressure detection means, disposed in a portion of the secondary air supply path 61 located downstream of the air pump 62 and upstream of the ASV 63.

Figure 2:
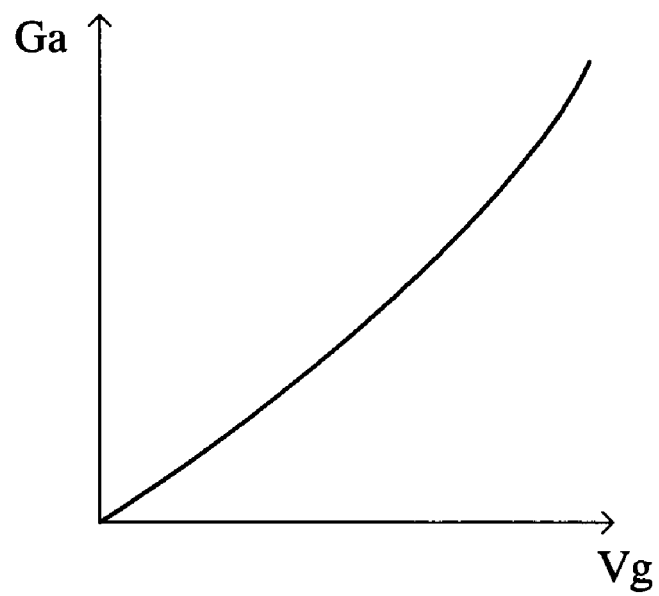
FIG. 2 is a map showing the relationship between the output voltage of the air flowmeter shown in FIG. 1 and a measured intake air flow rate.

The hot-wire air flowmeter 71 outputs voltage Vg in accordance with the mass flow rate of intake air flowing through the intake pipe 41. FIG. 2 shows the relationship between the output Vg of the air flowmeter 71 and the measured intake air flow rate Ga. The throttle position sensor 72, which serves as the throttle valve opening detection means, detects the opening of the throttle valve 43 and outputs a signal indicative of the throttle valve opening TA. The cam position sensor 73 generates a signal that assumes the form of a single pulse (G2 signal), every time the intake cam shaft rotates by 90° (i.e., every time the crankshaft 24 rotates by 180°). The crank position sensor 74, which serves as the rotational-speed detection means, outputs a signal that assumes the form of a narrow pulse every 10° rotation of the crankshaft 24 and assumes the form of a wide pulse every 360° rotation of the crankshaft 24. This signal indicates the engine speed NE. The water temperature sensor 75 detects the temperature of cooling water for the internal combustion engine 10 and outputs a signal indicative of the cooling water temperature THW.

The accelerator opening sensor 78 detects the travel Accp of an accelerator pedal 91 to be operated by a driver and outputs a signal indicative of the travel Accp. The pressure sensor 79, which serves as the pressure detection means, detects pressure in a portion of the secondary air supply path 61 located upstream of the ASV 63 and outputs a signal indicative of pressure as measured upstream of the ASV 63 (hereinafter referred as the "ASV upstream pressure") Pai.

An electric control device 80 is a microcomputer, which includes the following mutually bus-connected elements: a CPU 81; ROM 82, in which routines (programs) to be executed by the CPU 81, tables (lookup tables or maps), constants, and the like are stored beforehand; RAM 83, in which the CPU 81 stores data temporarily as needed; backup RAM 84, which stores data while power is held on and which retains the stored data even while power is held off; and an interface 85 including AD converters. The interface 85 is connected to the sensors 71 to 79. Signals from the sensors 71 to 79 are supplied to the CPU 81 through the interface 85. The CPU 81 sends, through the interface 85, respective drive signals to the actuator 33a of the variable intake timing unit 33, the igniter 38, the injector 39, the throttle valve actuator 43a, the air pump 62 (an unillustrated electric motor for driving the same), and the solenoid valve 66. The CPU 81 also sends, through the interface 85, an instruction signal for lighting an alarm lamp 92 to the alarm lamp 92 as needed in order to notify the user of anomaly in the secondary air supply system 60.

Outline of Secondary Air Supply Control (AI):

When the temperature of the catalytic converter 53, which is a three-way catalytic converter, disposed in the exhaust path of the internal combustion engine 10 is lower than an activation temperature needed for the catalytic converter 53 to exhibit its catalytic function, the catalytic converter 53 fails to sufficiently exhibit its exhaust purification function. Therefore, at the time of cold start when the temperature of the catalytic converter 53 is lower than the activation temperature, the catalytic converter 53 must be warmed up as soon as possible.

The catalytic converter 53 can be actively warmed up by supplying secondary air to a portion of the exhaust path located upstream of the catalytic converter 53 to thereby apply to the catalytic converter 53 heat of reaction that is generated when oxygen contained in the secondary air oxidizes unburnt components (particularly HC) contained in exhaust gas.

Thus, at the time of cold start, the CPU 81 causes the air pump 62 to run and the solenoid valve 66 to open (to change from the closed state to the open state) (thus causes the ASV 63 to open), thereby starting to perform the secondary air supply control. As a result of the air pump 62 rotating at a predetermined rotational speed, the pressure of air discharged from the air pump 62 (ASV upstream pressure Pai (the center value of the same)) increases from substantially atmospheric pressure to a predetermined air pump discharge pressure, and the discharged air (secondary air) passes through the ASV 63 and the reed valve 64 and is then supplied to a portion of the exhaust path located upstream of the catalytic converter 53.

Once started, the secondary air supply control continues over a predetermined duration required to warm up the catalytic converter 53 so long as the vehicle is in halt (specifically, the engine speed NE is maintained near the idling speed). When the predetermined duration elapses, the CPU 81 causes the air pump 62 to stop and the solenoid valve 66 to be closed (to change from the open state to the closed state) (thus causes the ASV 63 to be closed), thereby ending (stopping) the secondary air supply control. As a result, supply of secondary air to the exhaust path is stopped, and the ASV upstream pressure Pai (the center value of the same) drops again to substantially atmospheric pressure from the air pump discharge pressure.

When the secondary air supply control is performed, the air-fuel ratio of exhaust gas shifts slightly to the lean side, so that the purification efficiency of the catalytic converter 53 in relation to removal of $NO_x$ tends to drop, and thus the quantity of $NO_x$ emissions tends to increase. Thus, a vehicle running while secondary air supply control is being performed is undesirable. Therefore, in the case where a vehicle carrying the internal combustion engine 10 runs before the predetermined duration starting from the cold start elapses, the CPU 81 suspends the secondary air supply control for the period of time when the vehicle runs. Thus is outlined the secondary air supply control.

Outline of Anomaly Judgment Method for Secondary Air Supply System:

The secondary air supply path 61 is connected to the exhaust path of the internal combustion engine 10. Thus, when the ASV 63 is in the open state, exhaust pulsation, which unavoidably arises in the internal combustion engine 10, propagates into a portion of the secondary air supply path located upstream of the ASV 63 via the reed valve 64 and the ASV 63. As a result, the exhaust pulsation causes the ASV upstream pressure Pai to pulsate with a predetermined pulsation level. When the ASV 63 is in the closed state, the exhaust pulsation cannot propagate into a portion of the secondary air supply path located upstream of the ASV 63. As a result, the ASV upstream pressure Pai does not propagate. In other words, when the ASV upstream pressure Pai pulsates with a pulsation level equal to or higher than a predetermined reference pulsation level, this means that the ASV 63 is in the open state (in turn the secondary air supply path 61 is open); and when the ASV upstream pressure Pai pulsates with a pulsation level lower than the predetermined reference pulsation level (including the case where the same does not pulsate), this means that the ASV 63 is in the closed state (in turn the secondary air supply path 61 is closed).

When the air pump 62 is running, as mentioned above, the ASV upstream pressure Pai (the center value of the same) is maintained at the predetermined air pump discharge pressure. When the air pump 62 is in halt, the ASV upstream pressure Pai (the center value of the same) is maintained at substantially atmospheric pressure, since an upstream portion of the secondary air supply path 61 is connected to the intake path. In other words, when the ASV upstream pressure Pai is equal to or higher than the predetermined reference pressure Pref, which is lower than the air pump discharge pressure, this means that the air pump 62 is running; and when the ASV upstream pressure Pai is lower than the predetermined reference pressure Pref, this means that the air pump 62 is in halt.

Figure 3:
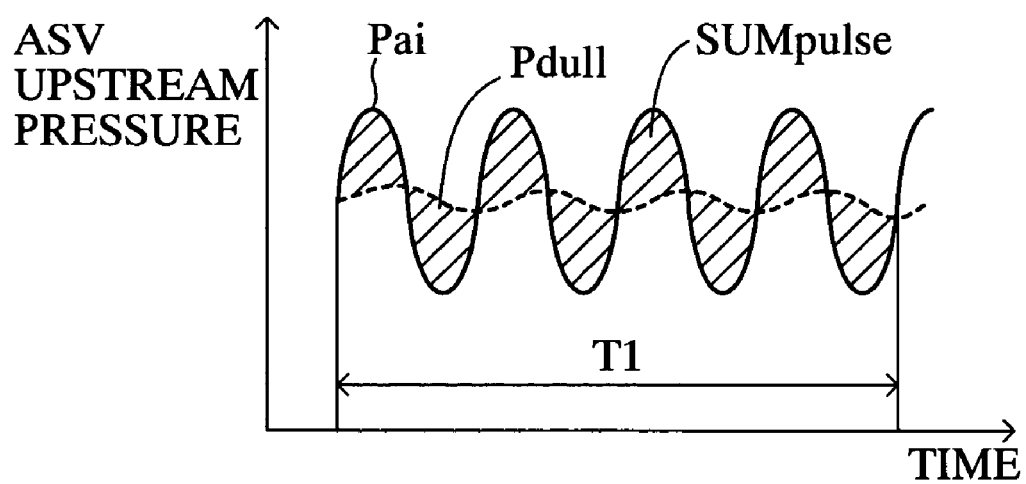
FIG. 3 is a view for explaining an integrated pulsation value by use of a graph showing a change in an ASV (air switching valve) upstream pressure and a dulled pressure with time.

The pulsation level of the ASV upstream pressure Pai can be represented by use of the integrated pulsation value SUMpulse expressed below by Expression 1. Specifically, the absolute value of the deviation between the ASV upstream pressure Pai (current pressure or instantaneous pressure) and the dulled pressure Pdull that follows the ASV upstream pressure Pai in a predetermined relation (in accordance with a dulling time constant) is obtained every arithmetic cycle of the CPU 81. The thus-obtained absolute value of the deviation is integrated over the predetermined period of time T1. The integrated pulsation value SUMpulse corresponds to the total area of hatched regions shown in FIG. 3 and increases with the pulsation level of the ASV upstream pressure Pai.

$$SUMpulse=\Sigma|Pai-Pdull| \text{ (interval of integration: } T1) \quad \text{Expression 1}$$

The predetermined period of time T1 (length of the same) is determined in accordance with the engine speed NE as measured at the starting point of the predetermined period of time T1. The starting point of the predetermined period of time T1 is when a predetermined time has elapsed after the start of a secondary air supply control so as to allow the air pump 62 to reach its predetermined rotational speed, as well as when a predetermined time has elapsed after the end of the secondary air supply control so as to allow the air pump 62 to completely stop rotating. The dulled pressure (current value of the same) Pdull is calculated every arithmetic cycle of the CPU 81 in accordance with Expression 2 shown below. In Expression 2, Pai is the current value of the ASV upstream pressure (value obtained at the current point of calculation); Pdullb is the last value of dulled pressure; and T is a dulling time constant (>1 (constant value)). The current dulled pressure Pdull is calculated on the basis of the deviation between the current ASV upstream pressure Pai and the last dulled pressure Pdullb.

$$Pdull=(1/T)\cdot(Pai-Pdullb)+Pdullb \quad \text{Expression 2}$$

Figure 4:
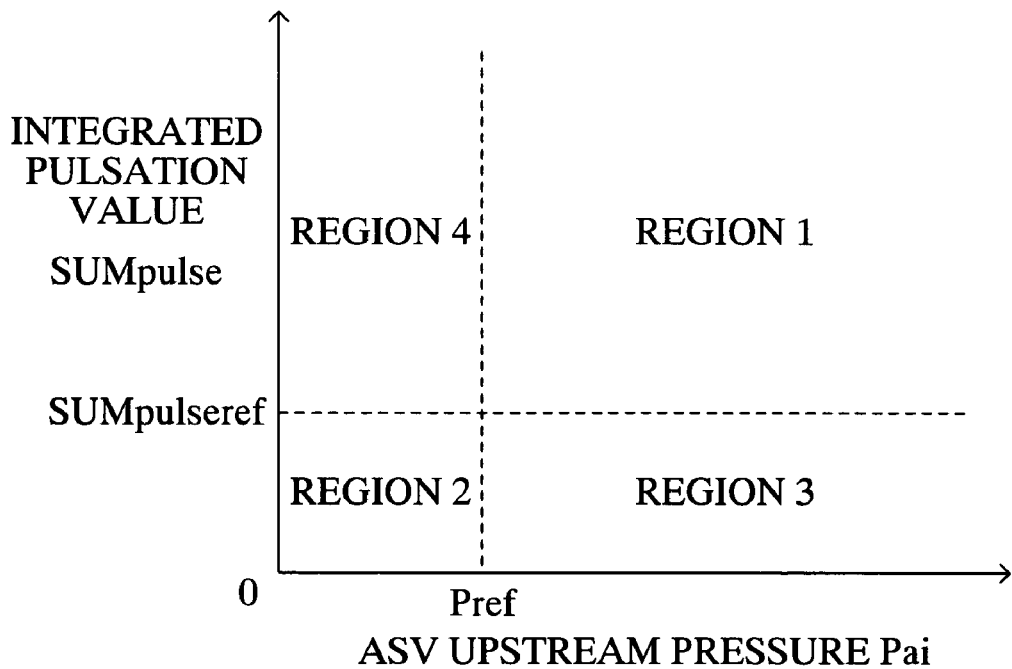
FIG. 4 is a map that the CPU shown in FIG. 1 references when judging whether or not the secondary air supply system is anomalous.

Thus, in the case where the CPU 81 instructs the secondary air supply system 60 to perform secondary air supply control (specifically, the CPU 81 instructs the air pump 62 to run and the solenoid valve 66 to open), if the air pump 62 and the ASV 63 (and other component parts) are normal, the ASV upstream pressure Pai and the integrated pulsation value SUMpulse must assume values falling within region 1 shown in FIG. 4 (i.e., the ASV upstream pressure Pai is equal to or higher than the reference pressure Pref, and the integrated pulsation value SUMpulse is equal to or greater than the reference integrated-pulsation-value SUMpulseref, which corresponds to the aforementioned predetermined reference pulsation level). By contrast, in the case where the CPU 81 instructs the secondary air supply system 60 to stop secondary air supply control (specifically, the CPU 81 instructs the air pump 62 to stop running and the solenoid valve 66 to close), if the air pump 62 and the ASV 63 (and other component parts) are normal, the ASV upstream pressure Pai and the integrated pulsation value SUMpulse must assume values falling within region 2 shown in FIG. 4 (i.e., the ASV upstream pressure Pai is lower than the reference pressure Pref, and the integrated pulsation value SUMpulse is smaller than the reference integrated-pulsation-value SUMpulseref).

Thus, every time secondary air supply control starts or ends (specifically, when the CPU 81 issues an instruction to perform secondary air supply control or when the CPU 81 issues an instruction to stop secondary air supply control), the anomaly judgment apparatus (hereinafter may be referred to as the "present apparatus") for a secondary air supply system according to the present invention starts once an anomaly judgment process (specifically, a process for integrating the aforementioned deviation over the predetermined period of time T1 in order to obtain the integrated pulsation value SUMpulse) for judging whether or not the secondary air supply system 60 is anomalous. Every time the predetermined period of time T1 elapses, the anomaly judgment apparatus judges whether or not the secondary air supply system 60 is anomalous, as described below.

<In the Case Where the CPU 81 has Issued an Instruction to Perform Secondary Air Supply Control>

In this case, when the ASV upstream pressure Pai and the integrated pulsation value SUMpulse assume values falling within region 1 shown in FIG. 4, the present apparatus judges that the secondary air supply system 60 is normal. When the Pai and SUMpulse values fall outside region 1 shown in FIG. 4, the present apparatus judges that the secondary air supply system 60 is anomalous.

When the Pai and SUMpulse values fall within region 2 shown in FIG. 4, this indicates the occurrence of such an anomaly that, for example, the air pump 62 fails to run, and the ASV 63 fails to open (the ASV 63 is fixed in the closed state). When the Pai and SUMpulse values fall within region 3 shown in FIG. 4, this indicates the occurrence of such an anomaly that, for example, the ASV 63 fails to open. When the Pai and SUMpulse values fall within region 4 shown in FIG. 4, this indicates the occurrence of such an anomaly that, for example, the air pump 62 fails to run.

<In the Case Where the CPU 81 has Issued an Instruction to Stop Secondary Air Supply Control>

In this case, when the ASV upstream pressure Pai and the integrated pulsation value SUMpulse assume values falling within region 2 shown in FIG. 4, the present apparatus judges that the secondary air supply system 60 is normal. When the Pai and SUMpulse values fall outside region 2 shown in FIG. 4, the present apparatus judges that the secondary air supply system 60 is anomalous.

When the Pai and SUMpulse values fall within region 1 shown in FIG. 4, this indicates the occurrence of such an anomaly that, for example, the air pump 62 fails to stop, and the ASV 63 fails to close (the ASV 63 is fixed in the open state). When the Pai and SUMpulse values fall within region 3 shown in FIG. 4, this indicates the occurrence of such an anomaly that, for example, the air pump 62 fails to stop. When the Pai and SUMpulse values fall within region 4 shown in FIG. 4, this indicates the occurrence of such an anomaly that, for example, the ASV 63 fails to close. When the present apparatus completes the judgment once each in the case where an instruction to perform secondary air supply control is issued and in the case where an instruction to stop secondary air supply control is issued, since then, the present apparatus does not perform the judgment process until the operation of the internal combustion engine 10 ends. Means for judging as described above whether or not the secondary air supply system 60 is anomalous corresponds to the anomaly judgment means.

Outline of Prohibition of Anomaly Judgment Because of Propagation of Intake Air Pulsation:

In the case where the throttle valve downstream pressure Pm is higher than the hydrodynamic critical pressure, when the throttle valve downstream pressure Pm varies, the throttle valve passing air flow rate mt can vary. When the throttle valve downstream pressure Pm is equal to or lower than the hydrodynamic critical pressure (and the throttle valve opening TA is constant), the velocity of air passing through the throttle valve 43 reaches sonic velocity, and thus the throttle valve passing air flow rate mt becomes constant irrespective of the throttle valve downstream pressure Pm.

Figure 5:
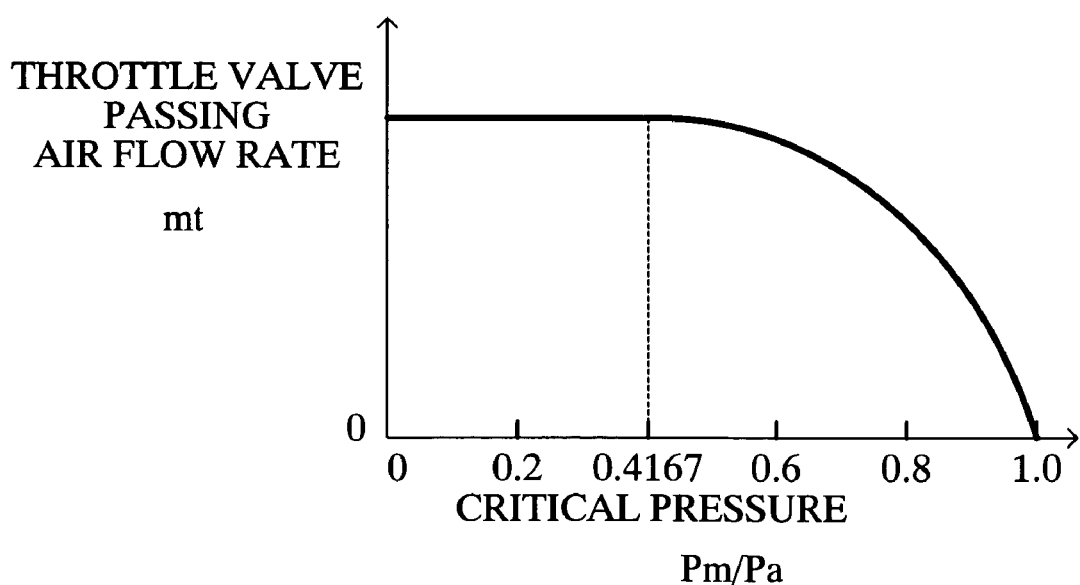
FIG. 5 is a graph showing the relationship between a throttle valve passing air flow rate and a value obtained by dividing a throttle valve downstream pressure by a throttle valve upstream pressure (i.e., atmospheric pressure) in the case where a predetermined constant throttle valve opening is maintained.

The above feature will be described more specifically. FIG. 5 is a graph showing the relationship between the throttle valve passing air flow rate mt and a value (Pm/Pa) obtained by dividing the throttle valve downstream pressure Pm by the throttle valve upstream pressure Pa (i.e., atmospheric pressure) in the case where the throttle valve opening TA assumes a predetermined constant value. As shown in FIG. 5, within the range where the throttle valve downstream pressure Pm is higher than the critical pressure (i.e., value (Pm/Pa)>0.4167), as the value (Pm/Pa) decreases from "1" (therefore, as the throttle valve downstream pressure Pm decreases), the throttle valve passing air flow rate mt increases. In this case, as the throttle valve downstream pressure Pm approaches the critical pressure from the throttle valve upstream pressure Pa (i.e., atmospheric pressure), the ratio of a change in the throttle valve passing air flow rate mt to a change in the throttle valve downstream pressure Pm falls. When the throttle valve downstream pressure Pm is equal to or lower than the critical pressure (i.e., value (Pm/Pa)≦0.4167), the throttle valve passing air flow rate mt becomes constant irrespective of the value (Pm/Pa) (thus, irrespective of the throttle valve downstream pressure Pm). The value "0.4167" is based on $(1/(\kappa+1))$. $\kappa$ is specific heat ratio. In the present embodiment, air is handled as a 2-atom molecule consisting of two atoms—an oxygen atom and a nitrogen atom—and thus $\kappa$ is set to 1.4 (constant value).

Thus, when the throttle valve downstream pressure Pm is higher than the critical pressure, the velocity of air passing through the throttle valve 43 becomes lower than sonic velocity, and consequently the throttle valve passing air flow rate mt can fluctuate in accordance with intake air pulsation that arises in a portion of the intake path located downstream of the throttle valve 43; accordingly, intake air pulsation can propagate into a portion of the intake path located upstream of the throttle valve 43 (and thus into the secondary air supply path 61). In this case, as the throttle valve downstream pressure Pm approaches the critical pressure from the throttle valve upstream pressure Pa (i.e., atmospheric pressure), the degree of propagation of intake air pulsation into the secondary air supply path 61 decreases. When the throttle valve downstream pressure Pm is equal to or lower than the critical pressure, the velocity of air reaches sonic velocity, so that the throttle valve passing air flow rate mt does not fluctuate in accordance with intake air pulsation; accordingly, intake air pulsation does not propagate into a portion of the intake path located upstream of the throttle valve 43 (and thus into the secondary air supply path 61). When intake air pulsation propagates into the secondary air supply path 61, the integrated pulsation value SUMpulse calculated by the aforementioned Expression 1 can differ from a value stemming from exhaust pulsation. Thus, when the calculated integrated pulsation value SUMpulse is used as a basis for judging whether or not the secondary air supply system 60 is anomalous, a false judgment may result.

Figure 6:
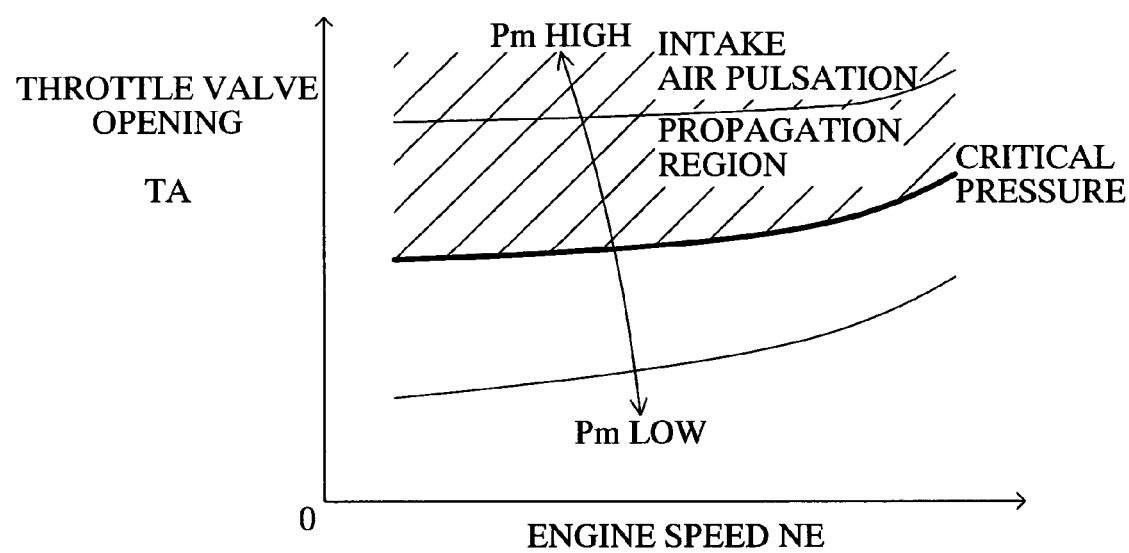
FIG. 6 is a graph representing a table for obtaining the throttle valve downstream pressure from an engine speed and a throttle valve opening.

FIG. 6 is a graph representing a table for obtaining the throttle valve downstream pressure Pm from the engine speed NE and the throttle valve opening TA. As shown in FIG. 6, the throttle valve downstream pressure Pm can be determined on the basis of the engine speed NE and the throttle valve opening TA. As seen from FIG. 6, the throttle valve downstream pressure Pm increases as the throttle valve opening TA increases or as the engine speed NE decreases. The hatched region in FIG. 6 is where intake air pulsation can propagate into the secondary air supply path 61 (hereinafter referred to as the "intake air pulsation propagation region").

Thus, in the period of execution of the aforementioned anomaly judgment process for judging whether or not the secondary air supply system 60 is anomalous (specifically, in the period of execution of integration of the aforementioned deviation over the predetermined period of time T1 for obtaining the integrated pulsation value SUMpulse), when the engine speed NE obtained from an output of the crank position sensor 74 and the throttle valve opening TA detected by the throttle position sensor 72 assume values falling within the intake air pulsation propagation region of the table (acquisition means) shown in FIG. 6 (i.e., when the "degree of propagation of intake air pulsation into the secondary air supply path 61" acquired by the acquisition means is equal to or greater than a predetermined degree), the present apparatus discontinues integrating the deviation for obtaining the integrated pulsation value SUMpulse (i.e., the present apparatus does not make the aforementioned judgment). Means for prohibiting judgment by the anomaly judgment means as described above corresponds to the anomaly judgment prohibition means.

Subsequently, when the engine speed NE and the throttle valve opening TA assume values falling outside the intake air pulsation propagation region (falling in a region in which propagation of intake air pulsation does not occur), the present apparatus initializes the integrated pulsation value SUMpulse to zero; resets the predetermined period of time T1 in accordance with the engine speed NE as measured at the point of time; and again begins at the point of time to integrate the deviation over the predetermined period of time T1 that has been reset as described previously, in order to obtain the integrated pulsation value SUMpulse. When the reset predetermined period of time T1 elapses, the present apparatus makes judgment on the basis of the currently obtained integrated pulsation value SUMpulse.

Outline of Prohibition of Anomaly Judgment Because of Occurrence of Air Column Vibration:

When the throttle valve opening TA varies, the throttle valve passing air flow rate mt varies, and in turn the flow rate of air passing through the air filter 42 varies. When the flow rate of air passing through the air filter 42 varies, the magnitude of pressure loss associated with the air filter 42 varies. Accordingly, when the throttle valve opening TA changes abruptly, the throttle valve upstream pressure Pa changes abruptly. As a result, air column vibration can arise in the secondary air supply path 61, which is connected to a portion of the intake path located upstream of the throttle valve 43. Influence of the air column vibration emerges as an output of the pressure sensor 79. Thus, as in the previously described case of propagation of intake air pulsation into the secondary air supply path 61, when the throttle valve opening TA changes abruptly, over a predetermined period of time ranging from the abrupt change to attenuation of the air column vibration, the integrated pulsation value SUMpulse can be calculated as a value different from a value stemming from exhaust pulsation. Therefore, when the calculated integrated pulsation value SUMpulse is used as a basis for judging whether or not the secondary air supply system 60 is anomalous, a false judgment may result.

Thus, the present apparatus obtains the rate of change DTA in the throttle valve opening TA detected by the throttle position sensor 72 and discontinues integrating the aforementioned deviation for obtaining the integrated pulsation value SUMpulse (i.e., the present apparatus does not make the aforementioned judgment) over the predetermined period of time T2 starting from a point of time when the absolute value of the obtained rate of change DTA becomes equal to or greater than the threshold value DTAref—the period of time T2 is slightly longer than a period of time required for the above-mentioned attenuation of air column vibration. Means for prohibiting judgment by the anomaly judgment means as described above also corresponds to the anomaly judgment prohibition means. Means for obtaining the rate of change DTA in the throttle valve opening TA as described above corresponds to the rate-of-change acquisition means.

Subsequently, when the predetermined period of time T2 elapses, the present apparatus initializes the integrated pulsation value SUMpulse to zero; resets the predetermined period of time T1 in accordance with the engine speed NE as measured at the point of time; and again begins at the point of time to integrate the aforementioned deviation over the reset period of time T1 in order to obtain the integrated pulsation value SUMpulse. When the reset predetermined period of time T1 elapses, the present apparatus makes judgment on the basis of the currently obtained integrated pulsation value SUMpulse.

Figure 7:
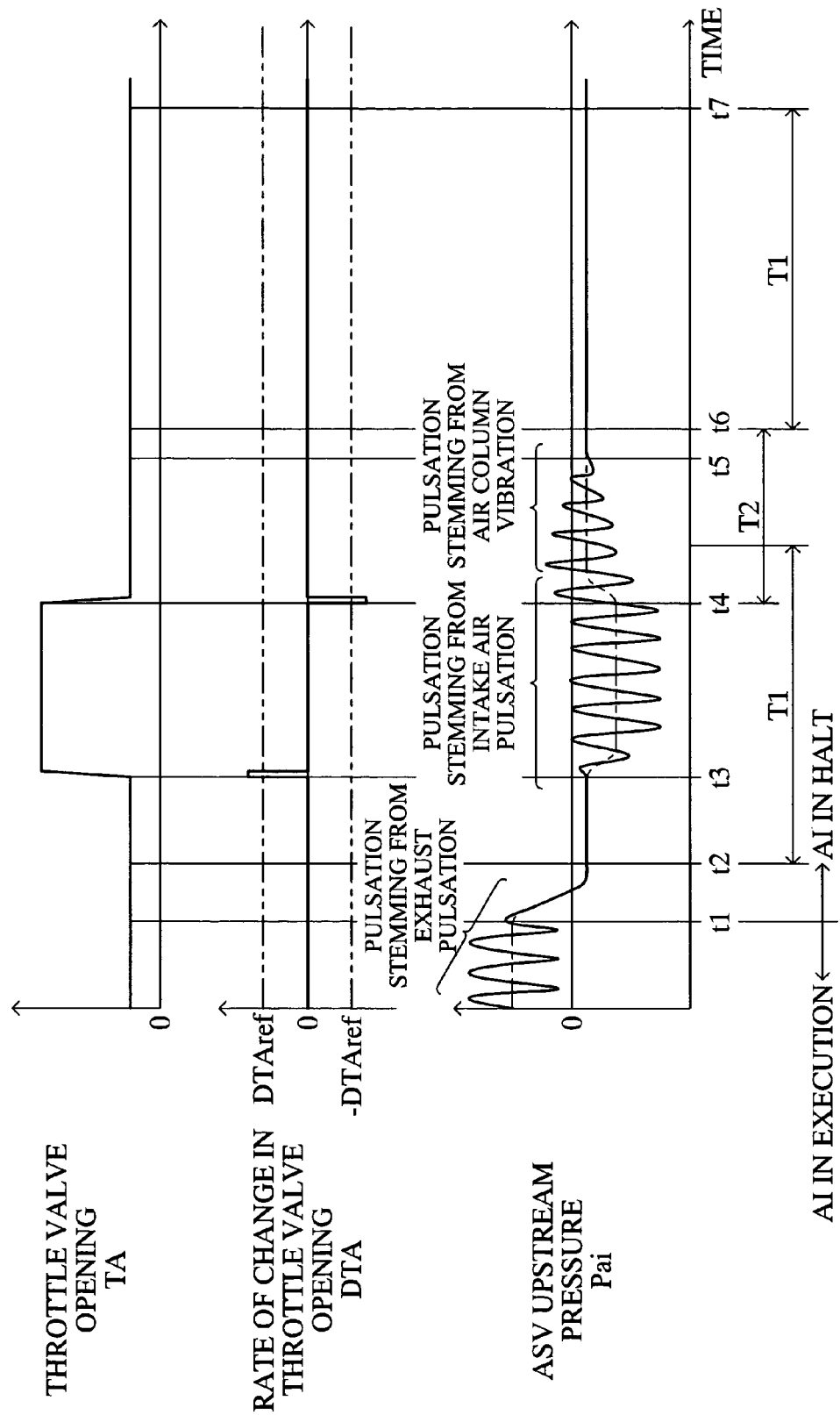
FIG. 7 is a timing chart showing example changes in the throttle valve opening, the rate of change in the throttle valve opening, and the ASV upstream pressure in the case where the secondary air supply system is normal, and secondary air supply control continues up to time t1 and ends at time t1.

FIG. 7 is a timing chart showing an example of a change in the throttle valve opening TA, the rate of change DTA in the throttle valve opening TA, and the ASV upstream pressure Pai in the case where the secondary air supply system 60 is normal, and secondary air supply control continues up to time t1 and ends at time t1. In the timing chart, the throttle valve opening TA is maintained at a small value equivalent to that at idle up to time t3 after end of secondary air supply control; is abruptly increased at time t3 to a predetermined large value and maintained at the predetermined large value up to time t4; and is abruptly decreased at time t4 to the small value and then maintained at the small value. The timing chart assumes that, when the throttle valve opening TA is maintained at the small value equivalent to that at idle, the engine speed NE and the throttle valve opening TA assume values falling outside the aforementioned intake air pulsation propagation region; and that, when the throttle valve opening TA is not maintained at the small value equivalent to that at idle (in FIG. 7, between time t3 and a point of time after elapse of a short time from time t4), the engine speed NE and the throttle valve opening TA assume values falling within the intake air pulsation propagation region.

As shown in FIG. 7, up to time t1, the air pump 62 is running, and the ASV 63 is in the open state; thus, exhaust pulsation propagates into a portion of the secondary air supply path 61 located upstream of the ASV 63 (intake air pulsation does not propagate thereinto). Accordingly, the exhaust pulsation causes the ASV upstream pressure Pai to pulsate with a predetermined amplitude while the predetermined air pump discharge pressure serves as a center value of the pulsation. When secondary air supply control ends at time t1, the air pump 62 is stopped, and the ASV 63 is closed.

Thus, at and after time t1, exhaust pulsation cannot propagate into a portion of the secondary air supply path 61 located upstream of the ASV 63, and intake air pulsation still does not propagate into the secondary air supply path 61; consequently, the ASV upstream pressure Pai stops pulsating and drops to a predetermined first negative pressure (a pressure after subtracting a pressure corresponding to a pressure loss associated with the air filter 42 from atmospheric pressure) from the aforementioned predetermined air pump discharge pressure. When a predetermined time required for the air pump 62 to completely stop rotating elapses from time t1 when secondary air supply control ends; i.e., at time t2, the present apparatus obtains the predetermined period of time T1 in accordance with the engine speed NE as measured at time t2 and starts the aforementioned anomaly judgment process (starts to integrate the aforementioned deviation), which is to be executed until the obtained predetermined period of time T1 elapses from time t2.

At time t3, as mentioned above, the throttle valve opening TA increases abruptly, and thus the throttle valve passing air flow rate mt (thus the flow rate of air passing through the air filter 42) increases abruptly; consequently, pressure loss associated with the air filter 42 increases abruptly, and the throttle valve upstream pressure Pa (thus the ASV upstream pressure Pai) drops abruptly from the first negative pressure to a second negative pressure, which is lower than the first negative pressure, within a short time starting from time t3. At and after time t3, since intake air pulsation propagates into the secondary air supply path 61, the intake air pulsation causes the ASV upstream pressure Pai to pulsate up to time t4 with a predetermined amplitude while the secondary negative pressure serves as a center value of the pulsation.

In this case, in the period extending between time t3 and a point of time after elapse of a short time from time t4, the present apparatus discontinues the integration of the deviation for obtaining the integrated pulsation value SUMpulse, which integration has been performed since time t2, since the engine speed NE and the throttle valve opening TA assume values falling within the aforementioned intake air pulsation propagation region.

At time t4, the throttle valve opening TA decreases abruptly, and thus the throttle valve passing air flow rate mt (thus the flow rate of air passing through the air filter 42) decreases abruptly; consequently, pressure loss associated with the air filter 42 decreases abruptly, and the throttle valve upstream pressure Pa (thus the ASV upstream pressure Pai) increases abruptly from the second negative pressure to the first negative pressure within a short time starting from time t4. As a result, air column vibration occurs in the secondary air supply path 61, and thus in the period between time t4 and time t5, until which the air column vibration attenuates completely, the air column vibration causes the ASV upstream pressure Pai to pulsate in an attenuating manner while the first negative pressure serves as a center value of the pulsation.

In this case, since at time t4 the absolute value of the rate of change DTA in the throttle valve opening TA becomes equal to or greater than the aforementioned threshold value DTAref, in the period between time t4 and a point of time after elapse of the predetermined period of time T2 from time t4; i.e., to time t6, the present apparatus still maintains the nonintegration state which has been maintained from time t3 and in which integration of the deviation is suspended. At time t6, the present apparatus initializes the integrated pulsation value SUMpulse to zero; resets the predetermined period of time T1 in accordance with the engine speed NE at time t6; and again begins at time t6 to integrate the deviation (thus to perform the anomaly judgment process) over the reset period of time T1 (in FIG. 7 between time t6 and time t7) in order to obtain the integrated pulsation value SUMpulse. When the reset predetermined period of time T1 elapses (in FIG. 7 at time t7), the present apparatus makes judgment on the basis of the currently obtained integrated pulsation value SUMpulse.

As described above, in the period between time t3 and time t6 when pulsation stemming from a cause (intake air pulsation or air column vibration) other than exhaust pulsation may arise in a portion of the secondary air supply path 61 located upstream of the ASV 63, the present apparatus discontinues integrating the deviation for obtaining the integrated pulsation value SUMpulse, which integration has been performed since time t2. In the period between time t6 and time t7 when pulsation stemming from a cause other than exhaust pulsation cannot arise, the present apparatus judges whether or not the secondary air supply system 60 is anomalous, on the basis of the integrated pulsation value SUMpulse that is obtained by integrating the deviation over the period between time t6 and time t7.

Actual Operation:

The actual operation of the thus-configured anomaly judgment apparatus for a secondary air supply system will next be described with reference to FIGS. 8 to 12, which are flowcharts showing routines to be executed by the CPU 81 of the electric control device 80.

Figure 8:
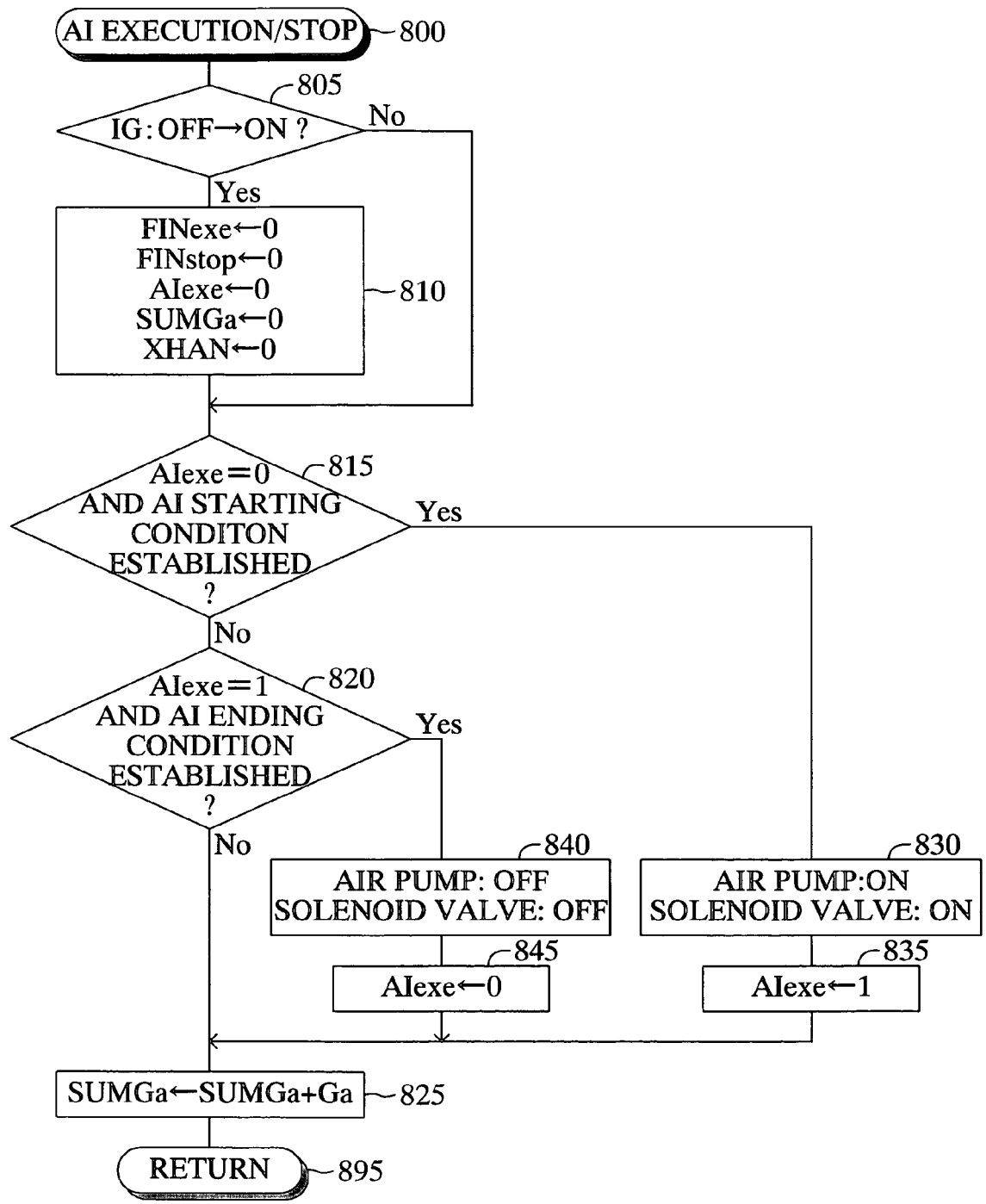
FIG. 8 is a flowchart showing a routine that the CPU shown in FIG. 1 executes for controlling execution and stop of AI (secondary air supply control)

Every time a predetermined time elapses, the CPU 81 executes the routine shown in FIG. 8 for controlling execution and stop of secondary air supply control. When predetermined timing is reached, the CPU 81 starts processing from step 800 and proceeds to step 805. In step 805, the CPU 81 judges whether or not the ignition switch IG is changed over in position from OFF to ON.

The following description assumes that a driver has just changed over the ignition switch IG from OFF to ON. In step 805, the CPU 81 makes the "Yes" judgment and proceeds to step 810. In step 810, the CPU 81 initializes relevant flags and variable to "0." When the value of the judgment during-AI-in-execution completion flag FINexe is "1," this indicates completion of the judgment in the case where the CPU 81 has issued an instruction to perform AI (hereinafter the case is referred to as "during AI in execution"). When the value of the FINexe flag is "0," this indicates that the judgment during AI in execution is not completed. When the value of the judgment during-AI-in-halt completion flag FINstop is "1," this indicates completion of the judgment in the case where the CPU 81 has issued an instruction to stop AI (hereinafter the case is referred to as "during AI in halt"). When the value of the FINstop flag is "0," this indicates that the judgment during AI in halt is not completed. When the value of the AI-in-execution flag AIexe is "1," this indicates that AI is in execution. When the value of the AIexe flag is "0," this indicates that AI is in halt. When the value of the anomaly-judgment-process-in-execution flag XHAN is "1," this indicates that the anomaly judgment process (specifically, integration of the deviation for obtaining the integrated pulsation value SUMpulse) is performed. When the value of the XHAN flag is "0," this indicates that the anomaly judgment process is not performed. The integrated intake air flow rate SUMGa is an integrated value of the intake air flow rate Ga.

Next, the CPU 81 proceeds to step 815 and judges whether or not the value of the AIexe flag is "0" and the AI starting condition is established. The AI starting condition is established, for example, when the cooling water temperature THW is equal to or lower than a predetermined temperature, and the ignition switch IG is changed over from ON to START (a cold start is activated) or when the cooling water temperature THW is equal to or lower than the predetermined temperature, the integrated intake air flow rate SUMGa does not reach the reference integrated-intake-air-flow-rate SUMGaref corresponding to the predetermined duration, and the engine speed NE is maintained near the idling speed for the predetermined period of time.

At the moment, the ignition switch IG has just been changed over from OFF to ON (i.e., the internal combustion engine 10 is not started yet), and thus the AI starting condition is not established. Therefore, the CPU 81 makes the "No" judgment in step 815 and proceeds to step 820. In step 820, the CPU 81 judges whether or not both of the following conditions are established: the value of the AI-in-execution flag AIexe is "1," and the AI ending condition is established. The AI ending condition is established, for example, when the engine speed NE is maintained at a predetermined running speed, which is higher than the idling speed, for a predetermined period of time (when the vehicle starts running) or when the integrated intake air flow rage SUMGa reaches the reference integrated-intake-air-flow-rate SUMGaref.

At the moment, since the value of the AI-in-execution flag AIexe is "0," the CPU 81 also makes the "No" judgment in step 820 and proceeds to step 825. In step 825, the CPU 81 adds the intake air flow rate Ga measured by the air flowmeter 71 to the integrated intake air flow rate SUMGa at that point of time, and sets the obtained sum as a new integrated intake air flow rate SUMGa. Then, the CPU 81 proceeds to step 895 and ends the present routine for the present. Subsequently, unless a cold start is performed, the CPU 81 repeatedly executes the processes of steps 800, 805, and 815–825.

It is supposed that the ignition switch IG is now changed over from ON to START to thereby perform a cold start. In this case, the CPU 81 makes the "Yes" judgment in step 815 and proceeds to step 830. In step 830, the CPU 81 instructs the secondary air supply system 60 to perform AI (specifically, the CPU 81 instructs the air pump 62 to run and the solenoid valve 66 to open). Then, the CPU 81 proceeds to step 835 and sets the AI-in-execution flag AIexe to "1." Subsequently, the CPU 81 proceeds to steps 825 and 895 and ends the present routine for the present. Thus, execution of AI starts.

After this, since the value of the AI-in-execution flag AIexe is "1," the CPU 81 repeatedly executes the processes of steps 800, 805, and 815–825 until the AI ending condition is established.

Next, judgment on start of the anomaly judgment process will be described. The CPU 81 repeatedly executes the routine shown in FIG. 9 every time a predetermined time elapses. Therefore, when predetermined timing is reached, the CPU 81 starts processing from step 900 and proceeds to step 905. In step 905, the CPU 81 judges whether or not the anomaly-judgment-process-in-execution flag XHAN is set to "0."

At the moment, since the value of the anomaly-judgment-process-in-execution flag XHAN is "0," the CPU 81 makes the "Yes" judgment in step 905 and proceeds to step 910. In step 910, the CPU 81 judges whether or not the following condition (a) or (b) is established: (a) after the value of the AI-in-execution flag AIexe changes from "0" to "1," a predetermined time required for the air pump 62 to reach the predetermined rotational speed has elapsed, and the value of the judgment during-AI-in-execution completion flag FINexe is "0"; and (b) after the value of the AI-in-execution flag AIexe changes from "1" to "0," a predetermined time required for the air pump 62 to completely stop rotating has elapsed, and the value of the judgment during-AI-in-halt completion flag FINstop is "0." In other words, the CUP 81 judges whether or not an instruction to execute AI during AI in halt is issued in a state in which the judgment during AI in execution is not completed or whether or not an instruction to stop AI during AI in execution is issued in a state in which the judgment during AI in halt is not completed. When the CPU 81 makes the "No" judgment, the CPU 81 immediately proceeds to step 995 and ends the present routine for the present.

It is supposed that a predetermined time required for the air pump 62 to reach the predetermined rotational speed has elapsed after execution of the step 835. In this case, since at the moment the value of the judgment during-AI-in-execution completion flag FINexe is "0," the CPU 81 makes the "Yes" judgment in step 910 and proceeds to step 915. In step 915, the CPU 81 sets the anomaly-judgment-process-in-execution flag XHAN to "1." In the subsequent step 920, the CPU 81 obtains the reference-value for judgment on end-of-anomaly-judgment-process Nref corresponding to the predetermined period of time T1 on the basis of the current engine speed NE and the function g of the engine speed NE.

Next, the CPU 81 proceeds to step 925. In step 925, the CPU 81 initializes all of the counter value N, which is used in a routine to be described later, the anomaly judgment process end flag FIN, and the integrated pulsation value SUMpulse to "0," and stores the current ASV upstream pressure Pai as the last dulled pressure Pdullb in order to prepare for calculation of a dulled pressure. Subsequently, the CPU 81 proceeds to step 995 and ends the present routine for the present. Notably, when the value of the anomaly judgment process end flag FIN is "1," this indicates that the anomaly judgment process is ended; and when the value of the anomaly judgment process end flag FIN is "0," this indicates that the anomaly judgment process is not ended.

As a result, the anomaly-judgment-process-in-execution flag XHAN is set to "1." Thus, after this, the CPU 81 makes the "No" judgment in step 905 and proceeds to step 930. Unless the value of the AI-in-execution flag AIexe changes while the anomaly judgment process is in execution, the CPU 81 makes the "No" judgment in step 930 and proceeds to step 995. The case where the value of the AI-in-execution flag AIexe changes while the anomaly judgment process is in execution will be described later.

Next, calculation of an integrated pulsation value will be described. The CPU 81 repeatedly executes the routine shown in FIG. 10 every time a predetermined time elapses. Therefore, when predetermined timing is reached, the CPU 81 starts processing from step 1000 and proceeds to step 1005. In step 1005, the CPU 81 judges whether or not the anomaly-judgment-process-in-execution flag XHAN is set to "1." When the CPU 81 makes the "No" judgment, the CPU 81 immediately proceeds to step 1095 and ends the present routine for the present.

It is supposed that the step 915 has just been executed. In this case, the value of the anomaly-judgment-process-in-execution flag XHAN is "1." Thus, the CPU 81 makes the "Yes" judgment in step 1005 and proceeds to step 1010. In step 1010, the CPU 81 calculates the current dulled pressure Pdull in accordance with the above-described Expression 2, and on the basis of the current ASV upstream pressure Pai and the last dulled pressure Pdullb. The last dulled pressure Pdullb to be used in the present step 1010 is a value that has been stored in the previous step 925.

Next, the CPU 81 proceeds to step 1015. In step 1015, the CPU 81 obtains the deviation Pulse by subtracting the current dulled pressure Pdull from the current ASV upstream pressure Pai. In the subsequent step 1020, the CPU 81 adds the absolute value of the deviation Pulse to the current integrated pulsation value SUMpulse (currently "0" as a result of execution of the previous step 925) and sets the obtained sum as a new integrated pulsation value SUMpulse (updates the integrated pulsation value SUMpulse).

Next, the CPU 81 proceeds to step 1025 and increments the current counter value N (currently "0" as a result of execution of the previous step 925) by "1" and sets the obtained value as a new counter value N. In the subsequent step 1030, the CPU 81 judges whether or not the counter value N is less than the reference-value for judgment on end-of-anomaly-judgment-process Nref that has been set in the previous step 920. That is, the counter value N indicates duration starting from a point of time when the anomaly judgment process has started, and the CPU 81 judges whether or not duration indicated by the counter value N has reached the predetermined period of time T1.

At the moment, since the counter value N is "1" and less than the reference-value for judgment on end-of-anomaly-judgment-process Nref, the CPU 81 makes the "Yes" judgment in step 1030 and proceeds to step 1035. In step 1035, the CPU 81 stores the current dulled pressure Pdull, which has been obtained in step 1010, as the last dulled pressure Pdullb. Subsequently, the CPU 81 proceeds to step 1095 and ends the present routine for the present.

After this, the CPU 81 repeatedly executes the processes of steps 1000-1035 until the counter value N, which increases by repeated execution of the process of step 1025, reaches the reference-value for judgment on end-of-anomaly-judgment-process Nref. In this manner, the integrated pulsation value SUMpulse undergoes integration. When (unless initialization of the integrated pulsation value SUMpulse, which will be described later, is performed) the predetermined period of time T1 elapses, and thus the counter value N reaches the reference-value for judgment on end-of-anomaly-judgment-process Nref, the CPU 81 makes the "No" judgment in step 1030 and proceeds to step 1040. In step 1040, the CPU 81 sets the anomaly-judgment-process-in-execution flag XHAN to "0." In the subsequent step 1045, the CPU 81 sets the anomaly judgment process end flag FIN to "1." Then, the CPU 81 proceeds to step 1095 and ends the present routine for the present.

After this, since the value of the anomaly-judgment-process-in-execution flag XHAN is "0," the CPU 81 makes the "No" judgment in step 1005 and immediately proceeds to step 1095; thus, calculation of the integrated pulsation value SUMpulse ends. The CPU 81 again makes the "Yes" judgment in step 905 of FIG. 9 and proceeds to step 910. In step 910, the CPU 81 monitors whether or not a predetermined time required for the air pump 62 to completely stop rotating has elapsed after the AI-in-execution flag AIexe is changed from current "1" to "0."

Figure 11:
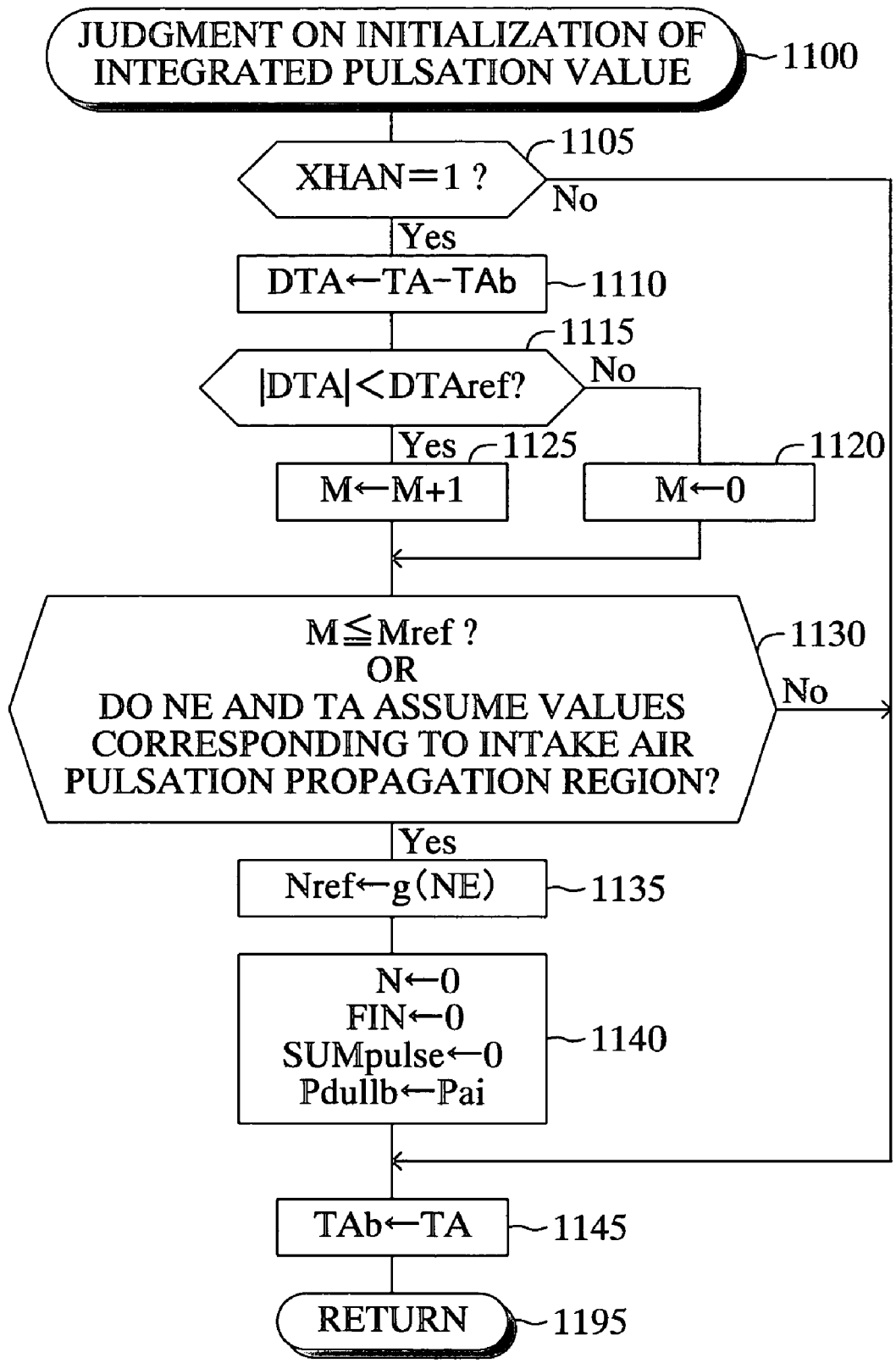
FIG. 11 is a flowchart showing a routine that the CPU shown in FIG. 1 executes for making judgment on initialization of the integrated pulsation value.

Meanwhile, in order to make judgment on initialization of the integrated pulsation value, the CPU 81 repeatedly executes the routine shown in FIG. 11 every time a predetermined time elapses. Therefore, when predetermined timing is reached, the CPU 81 starts processing from step 1100 and proceeds to step 1105. In step 1105, the CPU 81 judges whether or not the value of the anomaly-judgment-process-in-execution flag XHAN is "1." In the case where the CPU 81 makes the "No" judgment in step 1105, the CPU 81 immediately proceeds to step 1145. In step 1145, the CPU 81 stores the current throttle valve opening TA as the last throttle valve opening TAb. Then, the CPU 81 proceeds to step 1195 and ends the present routine for the present.

It is supposed that the step 915 has just been executed. In this case, the value of the anomaly-judgment-process-in-execution flag XHAN is "1." Thus, the CPU 81 makes the "Yes" judgment in step 1105 and proceeds to step 1110. In step 1110, the CPU 81 obtains the rate of change DTA in the throttle valve opening TA by subtracting the last throttle valve opening TAb from the throttle valve opening TA. The throttle valve opening TA to be used in step 1110 is a throttle valve opening that is currently detected by the throttle position sensor 72; and the last throttle valve opening TAb to be used in step 1110 is the latest value that was calculated in step 1145 at the time of last execution of the present routine.

Next, the CPU 81 proceeds to step 1115 and judges whether or not the absolute value of the rate of change DTA in the throttle valve opening is smaller than the threshold valve DTAref. In the case where in step 1115 the CPU 81 makes the "No" judgment, the CPU 81 proceeds to step 1120; clears the counter value M to "0" in step 1120; and then proceeds to step 1130. In the case where in step 1115 the CPU 81 makes the "Yes" judgment, the CPU 81 proceeds to step 1125; increments the current counter value M by "1" in step 1125; and then proceeds to step 1130. Therefore, when the value of the anomaly-judgment-process-in-execution flag XHAN is "1" (thus, when the anomaly judgment process is in execution), the counter value M indicates the duration of the state in which the absolute value of the rate of change DTA in the throttle valve opening is less than the threshold value DTAref.

In step 1130, the CPU 81 judges whether or not the counter value M is equal to or less than the reference-value for judgment on completion-of-attenuation-of-air-column-vibration Mref corresponding to the predetermined period of time T2 (i.e., whether or not the duration of the state in which the absolute value of the rate of change DTA in the throttle valve opening is less than the threshold value DTAref is equal to or less than the predetermined period of time T2 while the anomaly judgment process is in execution) or whether or not the engine speed NE and the throttle valve opening TA assume values falling within the intake air pulsation propagation region.

In the case where in step 1130 the CPU 81 makes the "No" judgment, the CPU 81 immediately proceeds to steps 1145 and 1195 and ends the present routine for the present. During the anomaly judgment process in execution, when the duration of the state in which the absolute value of the rate of change DTA in the throttle valve opening is less than the threshold value DTAref is equal to or less than the predetermined period of time T2, and the counter value M is equal to or less than the reference-value for judgment on completion-of-attenuation-of-air-column-vibration Mref (refer to the period between time t4 and time t6 in FIG. 7) or when the engine speed NE and the throttle valve opening TA assume values fall within the intake air pulsation propagation region (refer to the period between time t3 and a point of time after elapse of a short time from time t4 in FIG. 7); i.e., during the anomaly judgment process in execution, when the initialization condition for the integrated pulsation value SUMpulse is established, the CPU 81 makes the "Yes" judgment in step 1130 and executes the processes of steps 1135 and 1140, which are the same as the previous steps 920 and 925, respectively. Subsequently, the CPU 81 proceeds to steps 1145 and 1195 and ends the present routine for the present. Thus, while the integrated pulsation value SUMpulse, the counter value N, and the like are once cleared to "0," the integrated pulsation value SUMpulse is again calculated through subsequent repeated execution of the routines of FIGS. 10 and 11, and judgment on whether or not the above-mentioned integrated-pulsation-value initialization condition is established is executed. When, in the course of repeated execution of the routine of FIG. 10, the CPU 81 makes the "No" judgment in step 1030 and thus executes the process of step 1040 to thereby set the anomaly-judgment-process-in-execution flag XHAN to "0," subsequent to the point of time when the anomaly-judgment-process-in-execution flag XHAN is thus set to "0," the CPU 81 makes the "No" judgment in step 1105 and immediately proceeds to steps 1145 and 1195.

Next, anomaly judgment will be described. The CPU 81 repeatedly executes the routine shown in FIG. 12 every time a predetermined time elapses. Therefore, when predetermined timing is reached, the CPU 81 starts processing from step 1200 and proceeds to step 1205. In step 1205, the CPU 81 judges whether or not the anomaly judgment process end flag FIN is changed from "0" to "1." When the CPU 81 makes the "No" judgment, the CPU 81 immediately proceeds to step 1295 and ends the present routine for the present.

It is supposed that the step 1045 has just been executed. In this case, since the anomaly judgment process end flag FIN has just changed from "0" to "1," the CPU 81 makes the "Yes" judgment in step 1205 and proceeds to step 1210. In step 1210, the CPU 81 starts a process for judging whether or not the secondary air supply system 60 is anomalous.

In step 1210, the CPU 81 judges whether or not the AI-in-execution flag AIexe is "1." At the moment, since the AI ending condition in the previous step 820 is not established yet, and thus AI is in execution, the value of the AI-in-execution flag AIexe is maintained at "1." Therefore, the CPU 81 makes the "Yes" judgment in step 1210 and proceeds to step 1215. In step 1215, the CPU 81 sets the judgment during-AI-in-execution completion flag FINexe to "1." In the subsequent step 1220, the CPU 81 judges whether or not both of the following conditions (a) and (b) are established: (a) the integrated pulsation value SUMpulse, which has been updated by the process of the previous step 1020, is equal to or greater than the reference integrated-pulsation-value SUMpulseref; and (b) the current ASV upstream pressure Pai is equal to or higher than the reference pressure Pref (i.e., the CPU 81 judges whether or not the Pai and SUMpulse values fall within region 1 shown in FIG. 4).

When the CPU 81 makes the "Yes" judgment in step 1220 (i.e., when the Pai and SUMpulse values fall within region 1 shown in FIG. 4), the CPU 81 immediately proceeds to step 1295 and ends the present routine for the present. This case corresponds to the case where the secondary air supply system 60 is judged normal. By contrast, when, in step 1220, the CPU 81 makes the "No" judgment (i.e., the Pai and SUMpulse values fall outside region 1 shown in FIG. 4, so that the secondary air supply system 60 is judged anomalous), the CPU 81 proceeds to step 1225. In step 1225, the CPU 81 issues an instruction to light the alarm lamp 92 and stores in the backup RAM 84 the details of anomaly in the secondary air supply system 60. Then, the CPU 81 proceeds to step 1295 and ends the present routine for the present.

After this, since the value of the anomaly judgment process end flag FIN is maintained at "1," the CPU 81 makes the "No" judgment in step 1205 and immediately proceeds to step 1295. In step 1295, the CPU 81 ends the present routine for the present. In the above-described manner, while AI, which is started at the time of cold start, is continued (while the CPU 81 continuously instructs to execute AI), whether or not the secondary air supply system 60 during AI in execution is anomalous is judged once, and the judgment during-AI-in-execution completion flag FINexe is set to "1" in order to indicate that the judgment during AI in execution is completed.

Next will be described the case where, in the above state (a state in which AI, which is started at the time of cold start, is continued), the integrated intake air flow rate SUMGa reaches the reference integrated-intake-air-flow-rate SUMGaref (i.e., the predetermined duration elapses, and thus warming up the catalytic converter 53 is completed). In this case, as described previously, the value of the AI-in-execution flag AIexe is "1," and also the AI ending condition of the previous step 820 is established. Therefore, in step 820 of FIG. 8, the CPU 81 makes the "Yes" judgment and proceeds to step 840. In step 840, the CPU 81 instructs the secondary air supply system 60 to stop AI (specifically, the CPU 81 instructs the air pump 62 to stop and the solenoid valve 66 to close). Then, the CPU 81 proceeds to step 845 and changes the value of the AI-in-execution flag AIexe from current "1" to "0." Subsequently, the CPU 81 proceeds to steps 825 and 895 and ends the present routine for the present. Thus, AI is stopped.

After this, the AI starting condition is not established, because the AI-in-execution flag AIexe has been set to "0," and the integrated intake air flow rate SUMGa has reached the reference integrated-intake-air-flow-rate SUMGaref. Thus, the CPU 81 repeatedly executes the processes of steps 800, 805, and 815–825 until the internal combustion engine 10 stops (specifically, until the ignition switch IG is changed over from ON to OFF). Therefore, AI never resumes.

As described previously, at the moment, the CPU 81 is repeatedly monitoring, in step 910 of FIG. 9, whether or not a predetermined time required for the air pump 62 to completely stop rotating has elapsed after the AI-in-execution flag AIexe is changed from "1" to "0." At this time, supposing the previous step 845 is executed, and subsequently the predetermined time required for the air pump 62 to completely stop rotating has elapsed, since the value of the judgment during-AI-in-halt completion flag FINstop currently is maintained at "0," the CPU 81 makes the "Yes" judgment in step 910 and again executes the processes of step 915 and subsequent steps. Therefore, since the anomaly-judgment-process-in-execution flag XHAN is again set to "1," the CPU 81 makes the "Yes" judgment in both of step 1005 of FIG. 10 and step 1105 of FIG. 11 and resumes integration (update) from "0" for obtaining the integrated pulsation value SUMpulse and judgment on whether or not the aforementioned integrated-pulsation-value initialization condition is established.

Figure 10:
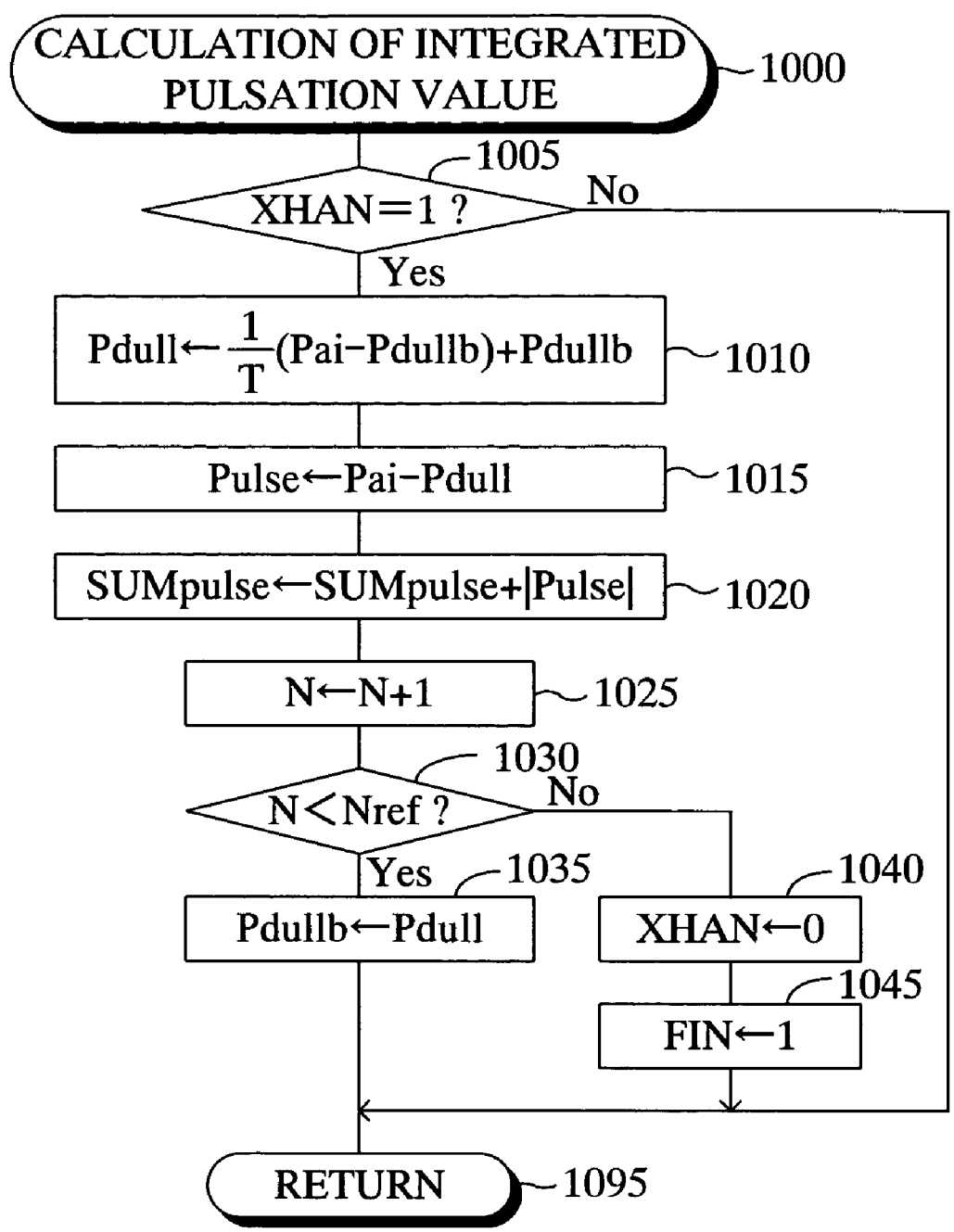
FIG. 10 is a flowchart showing a routine that the CPU shown in FIG. 1 executes for calculating the integrated pulsation value.
Figure 12:
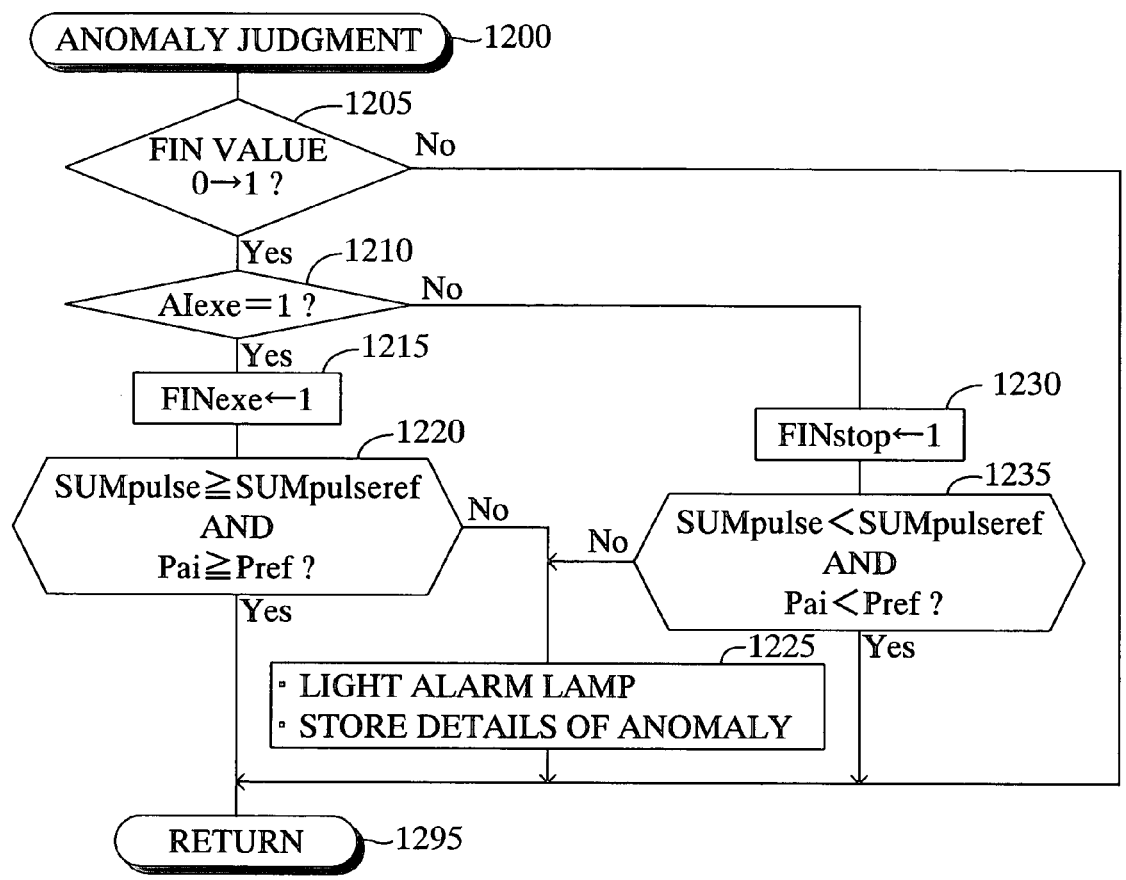
FIG. 12 is a flowchart showing a routine that the CPU shown in FIG. 1 executes for judging whether or not the secondary air supply system is anomalous.

When, in the course of repeated execution of the routine of FIG. 10, the CPU 81 makes the "No" judgment in step 1030 and thus executes the process of step 1045 to thereby change the value of the anomaly judgment process end flag FIN from "0" to "1," the CPU 81 again makes the "Yes" judgment in step 1205 of FIG. 12 and proceeds to step 1210. Since the value of the AI-in-execution flag AIexe is currently "0," the CPU 81 makes the "No" judgment in step 1210 and proceeds to step 1230. In step 1230, the CPU 81 sets the judgment during-AI-in-halt completion flag FINstop to "1." In the subsequent step 1235, the CPU 81 judges whether or not both of the following conditions (a) and (b) are established: (a) the integrated pulsation value SUMpulse, which has been updated by the process of the previous step 1020, is less than the reference integrated-pulsation-value SUMpulseref; and (b) the current ASV upstream pressure Pai is less than the reference pressure Pref (i.e., the CPU 81 judges whether or not the Pai and SUMpulse values fall within region 2 shown in FIG. 4).

When the CPU 81 makes the "Yes" judgment in step 1235 (i.e., when the Pai and SUMpulse values fall within region 2 shown in FIG. 4), the CPU 81 immediately proceeds to step 1295 and ends the present routine for the present. This case corresponds to the case where the secondary air supply system 60 is judged normal. By contrast, when, in step 1235, the CPU 81 makes the "No" judgment (i.e., the Pai and SUMpulse values fall outside region 2 shown in FIG. 4, so that the secondary air supply system 60 is judged anomalous), the CPU 81 proceeds to step 1225. In step 1225, the CPU 81 issues an instruction to light the alarm lamp 92 and stores in the backup RAM 84 the details of anomaly in the secondary air supply system 60. Then, the CPU 81 proceeds to step 1295 and ends the present routine for the present.

After this, since the value of the anomaly judgment process end flag FIN is maintained at "1," the CPU 81 makes the "No" judgment in step 1205 and immediately proceeds to step 1295. In step 1295, the CPU 81 ends the present routine for the present. In the above-described manner, while AI after cold start is ended and held in halt (while the CPU 81 continuously instructs to stop AI), whether or not the secondary air supply system 60 during AI in halt is anomalous is judged once, and the judgment during-AI-in-halt completion flag FINstop is set to "1" in order to indicate that the judgment during AI in halt is completed.

Figure 9:
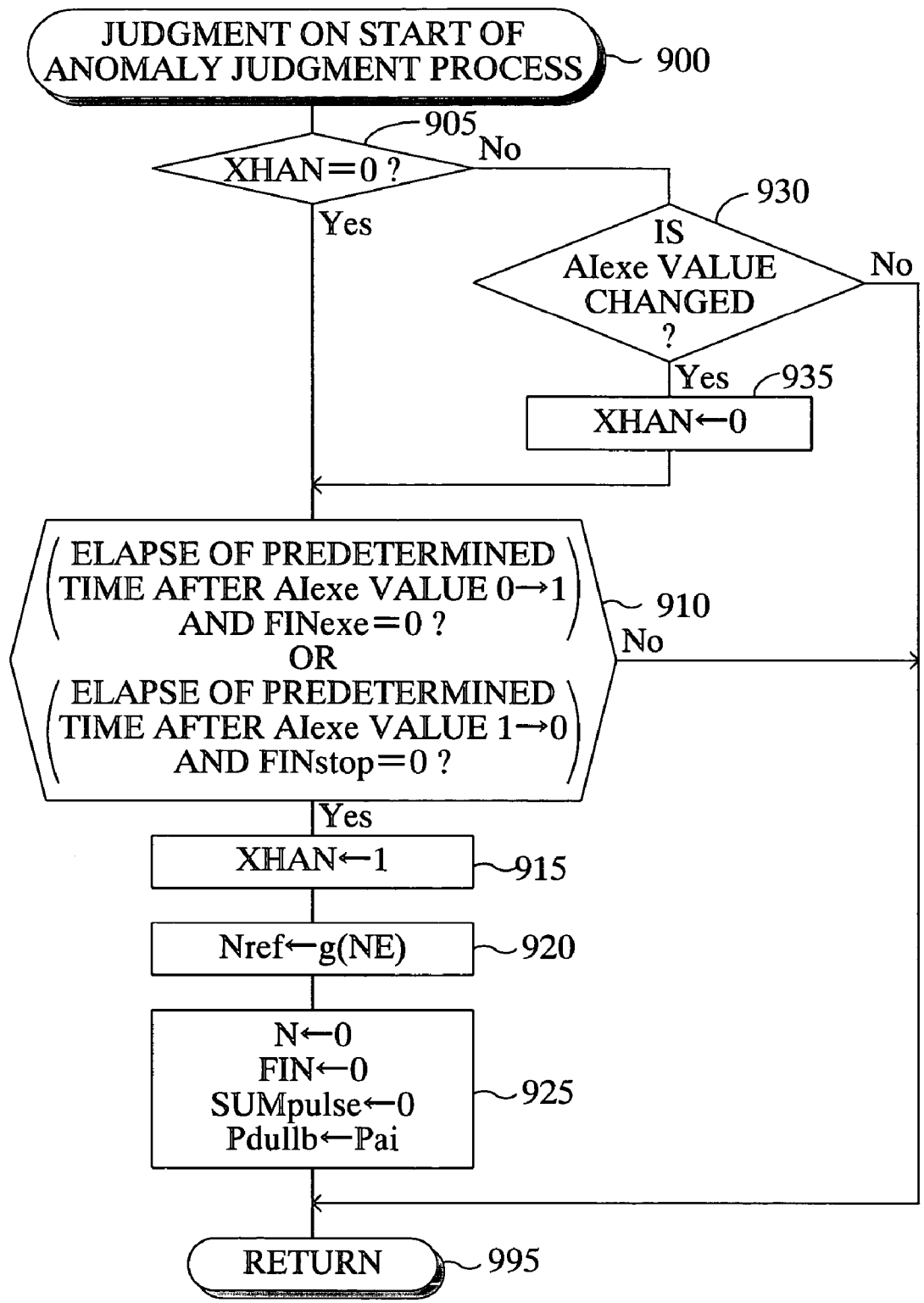
FIG. 9 is a flowchart showing a routine that the CPU shown in FIG. 1 executes for making judgment on start of an anomaly judgment process.

As a result, since the judgment during-AI-in-execution completion flag FINexe and the judgment during-AI-in-halt completion flag FINstop are both set to "1," the CPU 81 cannot make the "Yes" judgment in step 910 of FIG. 9. Therefore, since then, the CPU 81 does not proceed to step 915, in which the anomaly-judgment-process-in-execution flag XHAN is set to "1," and thus integration for obtaining the integrated pulsation value SUMpulse and judgment on the aforementioned abrupt change in pressure never resume. In the above-described manner, the anomaly judgment process for judging whether or not the secondary air supply system 60 is anomalous is started once when secondary air supply control is started or ended. Also, every time the anomaly judgment process ends, whether or not the secondary air supply system 60 is anomalous is judged.

In the case where the anomaly judgment process is in execution (i.e., the value of the anomaly-judgment-process-in-execution flag XHAN is "1"), when the value of the AI-in-execution flag AIexe changes (specifically, when the AI ending condition in step 820 of FIG. 8 is established during AI in execution or when the AI starting condition in step 815 of FIG. 8 is established during AI in halt), the CPU 81 makes the "No" judgment in step 905 of FIG. 9; proceeds to step 930 and makes "Yes" judgment; proceeds to step 935 and sets the anomaly-judgment-process-in-execution flag XHAN to "0;" and performs the judging process of step 910. In this case, the currently activated anomaly judgment process and judgment on whether or not the aforementioned integrated-pulsation-value initialization condition is established are stopped; and only when the condition of step 910 is established, the anomaly judgment process (integration from "0" for obtaining the integrated pulsation value) and judgment on whether or not the integrated-pulsation-value initialization condition is established are resumed.

As described above, according to the present embodiment, in the course of integration (update) over the predetermined period of time T1 for obtaining the integrated pulsation value SUMpulse, when the engine speed NE and the throttle valve opening TA assume values falling within the intake air pulsation propagation region of the table shown in FIG. 6; i.e., when intake air pulsation propagates into the secondary air supply path 61, integration (of the deviation Pulse) for obtaining the integrated pulsation value SUMpulse is discontinued, and anomaly judgment on the secondary supply system 60 on the basis of the integrated pulsation value SUMpulse whose integration has been discontinued is not carried out. Therefore, occurrence of a false judgment which could otherwise result from propagation of intake air pulsation into the secondary air supply path 61 is prevented.

In the course of integration (update) over the predetermined period of time T1 for obtaining the integrated pulsation value SUMpulse, when the absolute value of the rate of change DTA in the throttle valve opening TA becomes equal to or greater than the threshold value DTAref; i.e., when air column vibration occurs (is highly likely to occur) in the secondary air supply path 61, integration (of the deviation Pulse) for obtaining the integrated pulsation value SUMpulse is suspended over the predetermined period of time T2, which is slightly longer than a time required for the air column vibration to attenuate, starting from a point of time when the absolute value of the rate of change DTA becomes equal to or greater than the threshold value DTAref, and anomaly judgment on the secondary supply system 60 on the basis of the integrated pulsation value SUMpulse whose integration is suspended is not carried out. Therefore, occurrence of a false judgment which could otherwise result from occurrence of air column vibration in the secondary air supply path 61 is prevented.

The present invention is not limited to the above-described embodiment, but may be embodied in various other forms without departing from the scope of the invention. For example, the above embodiment is configured such that, when the engine speed NE and the throttle valve opening TA assume values falling within the intake air pulsation propagation region of the table shown in FIG. 6; i.e., when the throttle valve downstream pressure Pm is equal to or higher than the critical pressure, integration (of the deviation Pulse) for obtaining the integrated pulsation value SUMpulse is discontinued. However, the configuration may be such that, when the engine speed NE and the throttle valve opening TA assume values falling within a region that corresponds to the case where the throttle valve downstream pressure Pm is a predetermined pressure or more higher than the critical pressure, integration (of the deviation Pulse) for obtaining the integrated pulsation value SUMpulse is discontinued.

The above embodiment is configured such that, when the engine speed NE and the throttle valve opening TA become values falling within the intake air pulsation propagation region of the table shown in FIG. 6, integration (of the deviation Pulse) for obtaining the integrated pulsation value SUMpulse is immediately discontinued. However, the configuration may be such that, when a state in which the engine speed NE and the throttle valve opening TA assume values falling within the intake air pulsation propagation region of the table shown in FIG. 6 continues over a predetermined period of time, integration (of the deviation Pulse) for obtaining the integrated pulsation value SUMpulse is discontinued.

The above embodiment is configured such that, as represented by Expression 2, the current dulled pressure Pdull is calculated on the basis of the deviation between the current ASV upstream pressure Pai and the last dulled pressure Pdullb. However, the configuration may be such that the current dulled pressure Pdull is calculated on the basis of the deviation between the current ASV upstream pressure Pai and the last ASV upstream pressure Paib.

The above embodiment is configured such that the dulling time constant T in Expression 2 is a constant value. However, the configuration may be such that the dulling time constant T in Expression 2 varies in accordance with an operating condition (e.g., the engine speed NE) of the internal combustion engine 10.

The above embodiment is configured such that the integrated pulsation value SUMpulse is calculated by integrating, over the predetermined period of time T1, the absolute value of the deviation Pulse between the current ASV upstream pressure Pai and the current dulled pressure Pdull. However, the configuration may be such that the ASV upstream pressure Pai is stored every arithmetic cycle over the predetermined period of time T1; the values of the ASV upstream pressure Pai stored over the predetermined period of time T1 are averaged to obtain the average value Paiave; and the integrated pulsation value SUMpulse is calculated by integrating, over the predetermined period of time T1, the absolute value of the deviation between the ASV upstream pressure Pai and the average value Paiave. The above embodiment employs the integrated pulsation value SUMpulse as a pulsation level. However, the difference (amplitude) between the maximum value of the ASV upstream pressure Pai and the minimum value of the ASV upstream pressure Pai within the predetermined period of time T1 may be employed as a pulsation level.

The above embodiment is configured such that the predetermined period of time T1 (specifically, the reference-value for judgment on end-of-anomaly-judgment-process Nref) is determined in accordance with the engine speed NE as measured at the starting point of the predetermined period of time T1. However, the configuration may be such that the predetermined period of time T1 (specifically, the reference-value for judgment on end-of-anomaly-judgment-process Nref) is constant. The above embodiment is configured such that the predetermined period of time T2 (specifically, the reference-value for judgment on completion-of-attenuation-of-air-column-vibration Mref) is constant. However, the configuration may be such that the predetermined period of time T2 (specifically, the reference-value for judgment on completion-of-attenuation-of-air-column-vibration Mref) is determined in accordance with the engine speed NE as measured at the starting point of the predetermined period of time T2.

The above embodiment is configured such that the pressure sensor 79 is disposed in a portion of the secondary air supply path 61 located downstream of the air pump 62 and upstream of the ASV 63. However, the configuration may be such that the pressure sensor 79 is disposed in a portion of the secondary air supply path 61 located downstream of the ASV 63 (and upstream of the reed valve 64). In this case, whether or not the secondary air supply system 60 is anomalous is judged on the basis of the pressure of air (secondary air) in a portion of the secondary air supply path 61 located downstream of the ASV 63 and the pulsation level (integrated pulsation value) of the pressure.

The above embodiment is configured such that judgment as to whether or not the secondary air supply system 60 is anomalous is performed once in each of a period in which AI is executed and a period in which AI is stopped. However, the configuration may be such that judgment as to whether or not the secondary air supply system 60 is anomalous is performed a plurality of times in either the period in which AI is executed or the period in which AI is stopped.

What is claimed is:

1. An anomaly judgment apparatus for a secondary air supply system which includes a secondary air supply path for introducing secondary air into a portion of an exhaust path of an internal combustion engine located upstream of a catalytic converter disposed in the exhaust path from a portion of an intake path of the internal combustion engine located upstream of a throttle valve disposed in the intake path, comprising:

pressure detection means for detecting pressure in the secondary air supply path;

anomaly judgment means for calculating pulsation level indicative of the degree of pulsation of pressure detected by the pressure detection means and for judging, on the basis of at least the pulsation level, whether or not the secondary air supply system is anomalous; and anomaly judgment prohibition means for prohibiting judgment by the anomaly judgment means when the degree of propagation of intake air pulsation arising in the intake path into the secondary air supply path is equal to or higher than a predetermined level.

2. An anomaly judgment apparatus for a secondary air supply system according to claim 1, wherein the anomaly judgment prohibition means comprises:

rotational-speed detection means for detecting a rotational speed of the internal combustion engine;

throttle valve opening detection means for detecting an opening of the throttle valve; and acquisition means for acquiring the degree of propagation of the intake air pulsation into the secondary air supply path on the basis of the rotational speed of the internal combustion engine and the throttle valve opening; and the anomaly judgment prohibition means is configured such that, when the degree of propagation that the acquisition means acquires by use of the detected rotational speed of the internal combustion engine and the detected throttle valve opening is equal to or greater than the predetermined degree, the anomaly judgment prohibition means prohibits the anomaly judgment means from making judgment.

3. An anomaly judgment apparatus for a secondary air supply system according to claim 1, wherein the pulsation level is the amplitude of the detected pressure, or an integrated pulsation value that is obtained by integrating the absolute value of the deviation between the detected pressure and a dulled pressure that follows the detected pressure in a predetermined relation.

4. An anomaly judgment apparatus for a secondary air supply system according to claim 1, wherein the secondary air supply system to which the anomaly judgment apparatus is applied includes an air pump provided in the secondary air supply path and adapted to introduce air into the secondary air supply path, and an air switching valve provided in a portion of the secondary air supply path located downstream of the air pump and adapted to control opening and closing of the secondary air supply path.

5. An anomaly judgment apparatus for a secondary air supply system according to claim 1, wherein the anomaly judgment means is configured such that, when the anomaly judgment prohibition means prohibits making judgment, the anomaly judgment means judges whether or not the secondary air supply system is anomalous, on the basis of the pulsation level calculated after the prohibition is removed.

6. An anomaly judgment apparatus for a secondary air supply system which includes a secondary air supply path for introducing secondary air into a portion of an exhaust path of an internal combustion engine located upstream of a catalytic converter disposed in the exhaust path from a portion of an intake path of the internal combustion engine located downstream of an air filter disposed in the intake path and upstream of a throttle valve disposed in the intake path, comprising:
- pressure detection means for detecting pressure in the secondary air supply path;
- anomaly judgment means for calculating pulsation level indicative of the degree of pulsation of pressure detected by the pressure detection means and for judging, on the basis of at least the pulsation level, whether or not the secondary air supply system is anomalous;
- rate-of-change acquisition means for acquiring the rate of change in the opening of the throttle valve; and
- anomaly judgment prohibition means for prohibiting the anomaly judgment means from making judgment over a predetermined period of time starting from a point of time when an absolute value of the acquired rate of change becomes equal to or greater than a predetermined value.

\* \* \* \* \*